US012208043B2

(12) United States Patent
McNiven

(10) Patent No.: US 12,208,043 B2
(45) Date of Patent: Jan. 28, 2025

(54) APPARATUS, SYSTEM, AND METHOD FOR LIFTING A PATIENT

(71) Applicant: McNiven Patents, LLC, Burlington, WY (US)

(72) Inventor: Christian Sean McNiven, Burlington, WY (US)

(73) Assignee: McNiven Patents, LLC, Burlington, WY (US)

( * ) Notice: Subject to any disclaimer, the term of this patent is extended or adjusted under 35 U.S.C. 154(b) by 164 days.

(21) Appl. No.: 18/159,621

(22) Filed: Jan. 25, 2023

(65) Prior Publication Data

US 2024/0245565 A1 Jul. 25, 2024

(51) Int. Cl.
*A61G 7/10* (2006.01)

(52) U.S. Cl.
CPC ......... *A61G 7/1023* (2013.01); *A61G 7/1073* (2013.01)

(58) Field of Classification Search
CPC .... A61G 1/01; A61G 2200/34; A61G 7/1051; A61G 1/044; A61G 7/1023; A61G 1/013; A61G 2200/32; A61G 7/1061; A61G 1/048; A61G 7/1017; A61G 7/1046; A61G 7/1078; A61G 7/1084; A61G 2200/30; A61G 2200/322; A61G 2200/327; A61G 2200/54; A61G 2200/60; A61G 2210/30; A61G 7/1015; A61G 7/1026; A61G 7/1036; A61G 7/1038; A61G 7/1055; A61G 7/1073
USPC ............. 5/625, 627, 89.1, 628, 81.1 T, 83.1, 5/81.1 R, 695, 604, 494; 128/845, 870
See application file for complete search history.

(56) References Cited

U.S. PATENT DOCUMENTS

| | | | | |
|---|---|---|---|---|
| 3,013,282 | A | 12/1961 | Frank | |
| 3,234,568 | A * | 2/1966 | Fischer | A61G 7/1084 5/89.1 |
| 3,757,359 | A | 9/1973 | Stellman | |
| 4,601,075 | A | 7/1986 | Smith | |
| 4,675,925 | A | 6/1987 | Littleton | |
| 4,679,260 | A | 7/1987 | Frettem | |
| 4,723,327 | A | 2/1988 | Smith | |
| 4,748,701 | A | 6/1988 | Marlowe | |
| 4,944,057 | A | 7/1990 | Shaw | |
| 5,214,813 | A | 6/1993 | Gastle | |
| 5,271,110 | A | 12/1993 | Newman | |

(Continued)

FOREIGN PATENT DOCUMENTS

| | | |
|---|---|---|
| CA | 1266449 A | 3/1990 |
| EP | 0439808 B1 | 9/1994 |

(Continued)

OTHER PUBLICATIONS

"Slit." Dicitonary.com, Definition, www.dictionary.com/browse/islît.*

*Primary Examiner* — David R Hare
*Assistant Examiner* — Madison Emanski
(74) *Attorney, Agent, or Firm* — McKenzie Law, LLC; David McKenzie

(57) ABSTRACT

A lift device is presented that may include a sheet. Also, the lift device may include an opening that extends from an edge of the sheet. Furthermore, the lift device may include a closure having a fastener configured to extend across the opening. In addition, the lift device may include a feature such that activation of the closure at least partially closes the opening.

15 Claims, 10 Drawing Sheets

(56) References Cited

U.S. PATENT DOCUMENTS

| | | | | |
|---|---|---|---|---|
| 5,442,821 | A | 8/1995 | Weeks | |
| 5,530,975 | A | 7/1996 | Firebaugh | |
| 5,615,426 | A | 4/1997 | Hokett | |
| 5,978,989 | A | 11/1999 | Chavez | |
| 6,079,062 | A | 6/2000 | Mullin | |
| 6,289,534 | B1 | 9/2001 | Hakamiun | |
| 6,477,728 | B1 | 11/2002 | Faz | |
| 6,851,145 | B2 | 2/2005 | Smith | |
| 6,871,368 | B2 | 3/2005 | Calkin | |
| 6,883,190 | B2 | 4/2005 | Carbonneau | |
| 7,168,110 | B2 | 1/2007 | Girard | |
| 7,360,543 | B1 | 4/2008 | Coleman | |
| 7,624,458 | B2 | 12/2009 | Felling | |
| 8,065,765 | B2 | 11/2011 | Rincon | |
| 8,214,950 | B2 | 7/2012 | Topaz | |
| 8,281,430 | B1 | 10/2012 | Hough | |
| 8,336,141 | B2 | 12/2012 | Wong | |
| 8,938,828 | B2 | 1/2015 | Kenalty | |
| 9,925,097 | B2 | 3/2018 | Yancovitch | |
| 9,974,701 | B1 | 5/2018 | Haskell | |
| 10,085,901 | B1 | 10/2018 | Steinbock | |
| 10,561,557 | B2 * | 2/2020 | Emerson | A61G 7/1028 |
| 10,639,218 | B2 | 5/2020 | Wong | |
| 10,709,626 | B1 | 7/2020 | Gomez | |
| 10,799,409 | B2 * | 10/2020 | Rydstrom | A61G 7/1051 |
| 11,357,685 | B2 * | 6/2022 | Beed | A61G 7/1038 |
| 11,452,319 | B1 * | 9/2022 | Buonincontro | A41D 13/0543 |
| 2004/0226095 | A1 | 11/2004 | Lohse | |
| 2005/0283907 | A1 | 12/2005 | Dalton | |
| 2015/0283006 | A1 | 10/2015 | Akins | |
| 2018/0344555 | A1 * | 12/2018 | Olsson | A61G 7/1015 |
| 2019/0133850 | A1 | 5/2019 | Offen | |
| 2019/0151177 | A1 | 5/2019 | Giap | |

FOREIGN PATENT DOCUMENTS

| | | | |
|---|---|---|---|
| GB | 2105978 | B | 6/1985 |
| GB | 2320486 | A | 6/1998 |
| GB | 2402074 | A | 12/2004 |
| GB | 2466304 | B | 11/2011 |
| GB | 2516307 | A | 1/2015 |
| WO | WO2014033721 | A1 | 3/2014 |

* cited by examiner

APPARATUS, SYSTEM, AND METHOD FOR LIFTING A PATIENT

TECHNICAL FIELD

The present disclosure relates to apparatuses, devices, systems, and methods for lifting a person, animal, or patient. More specifically, the present disclosure relates to apparatuses, devices, systems, and methods for use when patients are in tight, close, or cramped conditions and would like a lift assist.

BACKGROUND

People or animals can experience falls in a variety of conditions and at any time of the day. Depending on the condition of the person or animal and nature of the fall, after a fall, a person or animal may be unable to move to a standing, prone, supine, kneeling, or sitting position, move from their position after the fall, seek help or medical care. This may be due to the physical condition or abilities of the person or animal, injuries received as a result of the fall, the person or animal becoming wedged or stuck between structures or fixtures, and/or for various other reasons. In such a condition, the person or animal may desire assistance to free themselves situation and/or to move from a position after the fall to a different position, such as a standing, seated, or other position. Such persons or animals are referred to herein as patients. Alternatively, or in addition, patients may intentionally take a position on a floor or ground without experiencing a fall, but then learn that they require assistance to move from the position on the floor or ground to a different position.

Various devices, apparatuses, and systems have been developed to assist patients who have experienced a fall to move from a fallen position to a desired new position. Unfortunately, these devices are inadequate to assist patients who are in a fallen position in very small, tight, or confined conditions. Advantageously, the present disclosure includes an apparatus, device, system, and/or method that overcomes this inadequacy.

SUMMARY

The various apparatuses, devices, systems and methods of the present disclosure have been developed in response to the present state of the art, and in particular, in response to the problems and needs in the art that have not yet been fully solved by currently available lift apparatuses, devices, systems, and methods.

In one general aspect, a lift device may include a sheet. Lift device may also include an opening that extends from an edge of the sheet. Lift device may furthermore include a closure having a fastener configured to extend across the opening. Lift device may in addition include where activation of the closure at least partially closes the opening.

Implementations may include one or more of the following features. A Lift device where the opening may include: a slit that extends from the edge of the sheet; and a shaped opening within a perimeter of the sheet, the shaped opening connected to the slit. A Lift device where the lift device may include a shaped opening closure having a shaped opening fastener that traverses the shaped opening. A Lift device where the shaped opening closure may include a plurality of shaped opening fasteners that traverse the shaped opening and each shaped opening fastener of the plurality of shaped opening fasteners may include a strap connected at a first end to one side of the shaped opening and connected at a second end to an opposite side of the shaped opening. A Lift device where the sheet may include three or more edges and where each strap couples to a handle near an edge of the sheet that does not include the opening. A Lift device where the fastener may include a first member and a second member configured to releasably engage the first member. A Lift device may include a shaped opening within a perimeter of the sheet, the shaped opening connected to the opening. A Lift device where the opening may include: a first opening edge and a second opening edge opposite the first opening edge; and where the fastener may include a first member, a second member, and a strap having: a first end coupled to the first member; a second end coupled to the sheet near the first opening edge; and where the second member is coupled to the sheet near the second opening edge. A Lift device where the closure may include a plurality of fasteners spaced along a length of the opening. A Lift device where the fastener may include an adjustable fastener configured to adjust from a first length to a second length. Implementations of the described techniques, features, and functionality may include devices, apparatuses, systems, or a method or process.

In one general aspect, a lift system may include a sheet having a first edge, a second edge opposite and parallel to the first edge, a third edge, and a fourth edge opposite and parallel to the third edge. The lift system may also include a shaped opening within a perimeter of the sheet. The lift system may furthermore include a slit that extends from the fourth edge and connects to the shaped opening. The lift system may in addition include a closure that at least partially closes the shaped opening and the slit when the closure is activated.

Implementations may include one or more of the following features. A lift system where the closure may include: a shaped opening closure having at least one strap, the at least one strap having a first end connected to a first edge of the shaped opening and a second end connected to a second edge of the shaped opening, the second edge opposite of the first edge; and a slit closure having at least one fastener having a first member and a second member configured to releasably engage the first member. A lift system where the at least one strap of the shaped opening closure is configured to close off the shaped opening during a lift operation and where the shaped opening may include an edge having a reinforcement member. A lift system where the first member may include a male side squeeze buckle and the second member may include a corresponding female side squeeze buckle. A lift system where the at least one fastener may include a first strap adjustably connected to the first member and a second strap connected to the second member such that a length of the second strap is adjustable. A lift system may include: at least one handle connected to one of the first edge, second edge, third edge, and fourth edge; and at least one reinforcement member that extends across a portion of the sheet. A lift system where two of the plurality of handles connect to the at least one reinforcement member. A lift system where the closure may include: a biasing member having a first end and second end, the first end connected to the sheet and the second end connected to one edge of one of the shaped opening and the slit; two or more fasteners and each of the fasteners may include a marking that facilitates activation of the closure; and where the biasing member is configured to apply a closure force on the one edge of the shaped opening in response to the one edge of the shaped opening being moved away from another edge of one of the shaped opening and the slit.

In one general aspect, a lift device may include a first panel having a first edge. Lift device may also include a second panel having a second edge. A lift device may furthermore include a closure having at least one fastener having: a first member coupled to one of the first edge and the second edge; a second member coupled to the other one of the first edge and the second edge; and where the first member and second member are configured to couple to each other.

Implementations may include one or more of the following features. A lift device where the first edge may include a first curved section positioned near a midpoint of the first edge and the second edge may include a second curved section positioned near a midpoint of the second edge and where the first curved section aligns with the second curved section when the closure is activated.

In one general aspect, method may include positioning a lift device in contact with the at least one body part of the patient, the lift device having: a sheet; a slit that extends from an edge of the sheet, the slit having a first opening edge and a second opening edge opposite the first opening edge; a shaped opening that connects to the slit and is within a perimeter of the sheet; at least one strap having a first end coupled near a first side of the shaped opening and a second end coupled near a second side of the shaped opening; at least one fastener having a first member coupled near the first opening edge and a second member coupled near the second opening edge, the second member configured to releasably engage the first member. A method may also include widening the slit by separating the first opening edge from the second opening edge. A method may furthermore include moving the first opening edge along a left side of the at least one body part. A method may in addition include moving the second opening edge along a right side of the at least one body part, the second side opposite the first side, such that the shaped opening is drawn against a third side of the at least one body part, the third side between the first side and the second side. A method may moreover include in response to moving the first opening edge along the left side and the second opening edge along the right side, coupling the first member of the at least one strap to the second member of the at least one strap such that the lift device circumscribes the at least one body part of the patient. A method may also include lifting the sheet to perform a lift operation of the patient.

The advantages, nature, and additional features of exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

DETAILED DESCRIPTION

Figure 1:
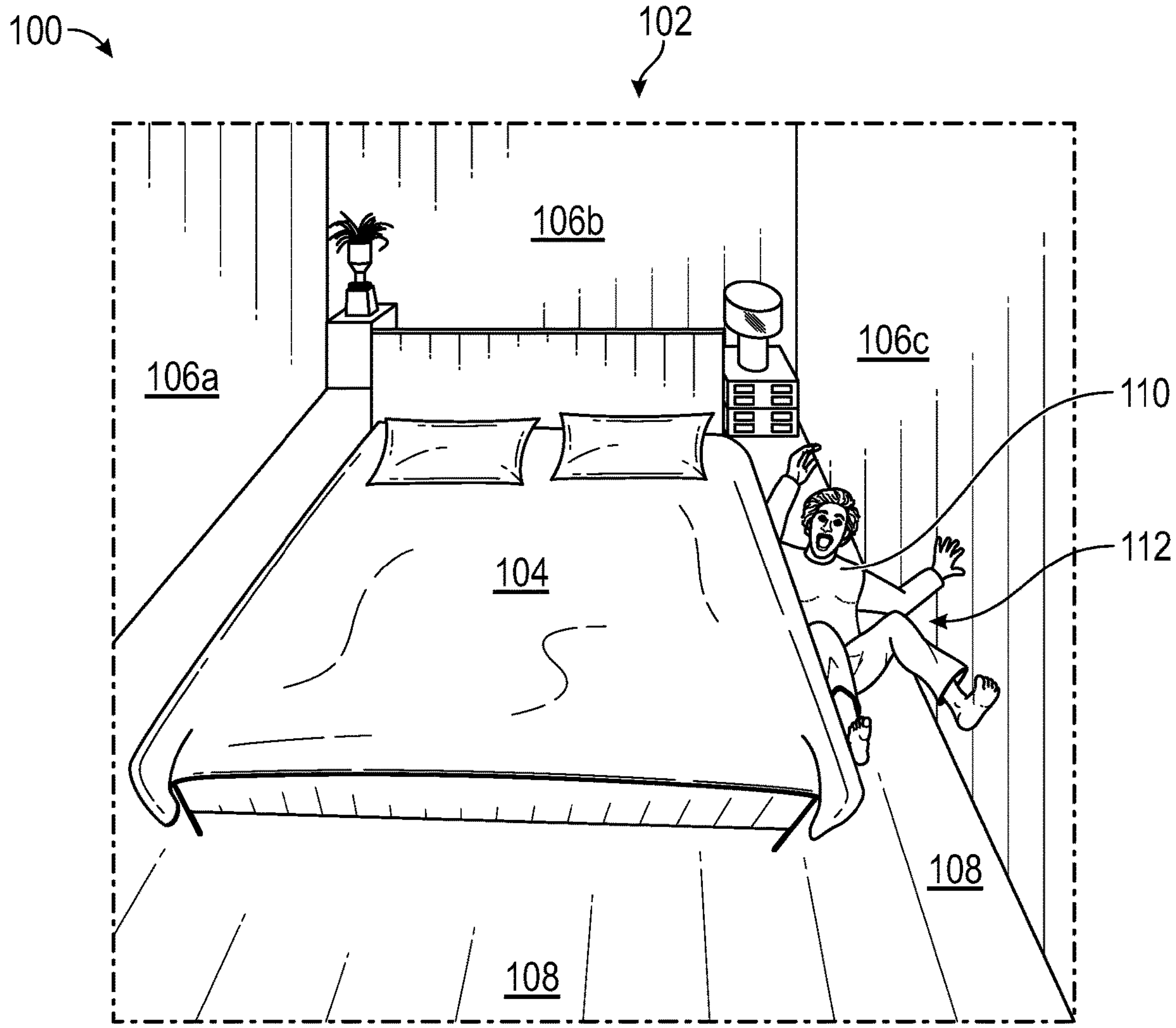
FIG. 1 is a perspective view of an example scenario of a patient desiring assistance.

Exemplary embodiments of the disclosure will be best understood by reference to the drawings, wherein like parts are designated by like numerals throughout. It will be readily understood that the components, as generally described and illustrated in the FIGS. herein, could be arranged and designed in a wide variety of different configurations. Thus, the following more detailed description of the embodiments of the apparatus, system, and method is not intended to limit the scope of the disclosure but is merely representative of exemplary embodiments.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature can pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

As used herein, a "fastener", "fixation device", or "fastener system" refers to any structure configured, designed, or engineered to join two structures. Fasteners may be made of a variety of materials including metal, plastic, composite materials, metal alloys, plastic composites, and the like. Examples of fasteners include, but are not limited to screws, rivets, bolts, nails, snaps, hook and loop, set screws, bone screws, nuts, posts, pins, thumb screws, and the like. Other examples of fasteners include, but are not limited to wires, Kirschner wires (K-wire), anchors, bone anchors, plates, bone plates, intramedullary nails or rods or pins, implants, sutures, soft sutures, soft anchors, tethers, interbody cages, fusion cages, and the like. In certain embodiments, the term fastener may refer to a fastener system that includes two or more structures configured to combine to serve as a fastener. An example of a fastener system is a rod or shaft having external threads and an opening or bore within another structure having corresponding internal threads configured to engage the external threads of the rod or shaft.

In certain embodiments, the term fastener may be used with an adjective or other modifier that identifies an object or structure that the fastener may be particularly configured, designed, or engineered to engage, connect to, join, contact, or couple together with one or more other structures of the same or different types. For example, a "sheet fastener" may refer to an apparatus, system, or device for joining or connecting one or more sheets, one or more parts of sheets, or the like. As used herein, the term "fastener" can include one or more modifiers that define specific types of "fastener" based on the purpose, function, operation, position, or location of the "fastener." As one example, a "shaped opening fastener" can refer to a "fastener" adapted, configured, designed, or engineered to close or secure a "shaped opening." Similarly, an "adjustable fastener" can refer to a "fastener" adapted, configured, designed, or engineered to adjust between a first length and a second length.

"Length" refers to a distance measured along a longest dimension of an object. (Search "length" on wordhippo.com. WordHippo, 2023. Web. Modified. Accessed Jan. 5, 2023.)

Standard medical planes of reference and descriptive terminology may be employed in this disclosure. While these terms are commonly used to refer to the human body, certain terms are applicable to physical objects in general. A standard system of three mutually perpendicular reference planes is employed. A sagittal plane divides a body into right and left portions. A coronal plane divides a body into anterior and posterior portions. A transverse plane divides a body into superior and inferior portions. A mid-sagittal, mid-coronal, or mid-transverse plane divides a body into equal portions, which may be bilaterally symmetric. The intersection of the sagittal and coronal planes defines a superior-inferior or cephalad-caudal axis. The intersection of the sagittal and transverse planes defines an anterior-posterior axis. The intersection of the coronal and transverse planes defines a medial-lateral axis. The superior-inferior or cephalad-caudal axis, the anterior-posterior axis, and the medial-lateral axis are mutually perpendicular.

Anterior means toward the front of a body. Posterior means toward the back of a body. Superior or cephalad means toward the head. Inferior or caudal means toward the feet or tail. Medial means toward the midline of a body, particularly toward a plane of bilateral symmetry of the body. Lateral means away from the midline of a body or away from a plane of bilateral symmetry of the body. Axial means toward a central axis of a body. Abaxial means away from a central axis of a body. Ipsilateral means on the same side of the body. Contralateral means on the opposite side of the body from the side which has a particular condition or structure. Proximal means toward the trunk of the body. Proximal may also mean toward a user, viewer, or operator. Distal means away from the trunk. Distal may also mean away from a user, viewer, or operator. Dorsal means toward the top of the foot or other body structure. Plantar means toward the sole of the foot or toward the bottom of the body structure.

Antegrade means forward moving from a proximal location/position to a distal location/position or moving in a forward direction. Retrograde means backward moving from a distal location/position to a proximal location/position or moving in a backwards direction. Sagittal refers to a midline of a patient's anatomy, which divides the body into left or right halves. The sagittal plane may be in the center of the body, splitting it into two halves. Prone means a body of a person lying face down. Supine means a body of a person lying face up.

"Sheet" refers to broad, planar, unbroken layer of material. Often, a sheet is thin. In certain embodiments, a sheet is rectangular. In certain embodiments, a sheet is pliable and/or flexible. A sheet can be a single unbroken piece or alternatively a sheet can include one or more openings, holes, or slits. A sheet may include one or more edges and the edges may be reinforced using a variety of features or techniques including a sewing seam, a doubled over and sewn portion of the sheet, a set if stiches, a strap sewn near, about, or around the edge, eyelets, reinforced corners, or the like. (Search "sheet" on wordhippo.com. WordHippo, 2023. Web. Modified. Accessed Jan. 5, 2023.) A sheet can be made of a variety of materials including, but not limited to, cloth, fabric, polyester, canvas, leather, nylon, polyethylene, polypropylene, ripstop nylon, 70 denim, and/or the like. The material of a sheet can be a single material or a weave or braid of threads, tethers, or straps of a single material or a combination of materials. Examples, of sheets include, but not limited to, tarps, blankets, covers, and the like. A sheet can be water-proof, water-resistant, fire-proof, fire-resistant, stain resistant, or the like depending on the composition, structure, configuration, and/or material of the sheet.

"Slit" refers to a type of opening. Often, a slit can start at an origin within an object and may include a first opening edge along one length of the object and a corresponding second opening edge along another length of the object, opposite the first opening edge. In one embodiment, the first opening edge and the second opening edge define the slit or define the edges of the slit. In certain embodiments, a slit is a long narrow opening within an object. Often a slit is a straight opening, but a slit can also have a curved or a non-straight configuration.

"Perimeter" refers to the outer limits of an area, object, or structure. (Search "perimeter" on wordhippo.com. WordHippo, 2023. Web. Modified. Accessed Jan. 5, 2023.) Perimeter can also refer to a boundary around or along a structure, object, or device.

As used herein, a "handle" refers to a structure used to hold, control, or manipulate a device, apparatus, component, tool, or the like. A "handle" may be designed to be grasped and/or held using one or two hands of a user.

"Strap" or "Strip" refers to a pliable long, narrow, piece of material. A strap may be made up of a single unbroken material or may be a woven construct such as a webbing. (Search "strap" on wordhippo.com. WordHippo, 2023. Web. Modified. Accessed Jan. 5, 2023.) A strap can be made of a variety of man-made or natural materials including, but not limited to, cloth, fabric, polyester, canvas, leather, nylon, polyethylene, polypropylene. A strap can be made of a variety of materials and can have a variety of sizes. In one embodiment, the strap is a 2 inch wide webbing strap.

The term "strap" may also be used in connection with an adjective or noun indicating an intended or proposed use for the strap. Examples include camping strap, utility strap, tie-down strap, and the like. A strap can have a first end and second end. Often one of the first end and the second end is coupled to a buckle or other fastener such that the buckle or other fastener remains permanently coupled to the strap at, or near one of the ends. In certain embodiments, one end of a strap can be permanently coupled to a first member of a fastener and the other end of the strap can be removably coupled to a second member of the fastener. The first member and the second member can be configured to releasably engage with each other to form the fastener and couple one end of the strap to another end or part of the strap.

As used herein, an "opening" refers to a gap, a hole, an aperture, a port, a portal, a slit, a space or recess in a structure, a void in a structure, or the like. In certain embodiments, an opening can refer to a structure configured specifically for receiving something and/or for allowing access. In certain embodiments, an opening can pass through a structure. In other embodiments, an opening can exist within a structure but not pass through the structure. In other embodiments, an opening can initiate on a surface or at an edge or at a side of a structure and extend into the structure for a distance, but not pass through or extend to another side or edge of the structure. In other embodiments, an opening can initiate on a surface or at an edge or at a side of a structure and extend into the structure until the opening extends through or extends to another side or edge of the structure. An opening can be two-dimensional or three-dimensional and can have a variety of geometric shapes and/or cross-sectional shapes, including, but not limited to a rectangle, a square, or other polygon, as well as a circle, an ellipse, an ovoid, or other circular or semi-circular shape. As used herein, the term "opening" can include one or more modifiers that define specific types of "openings" based on the purpose, function, operation, position, or location of the "opening." As one example, a "fastener opening" refers to an "opening" adapted, configured, designed, or engineered to accept or accommodate a "fastener."

"Shaped opening" refers to an opening that has a certain shape. A shaped opening can be two-dimensional or three-dimensional and can have a variety of regular or irregular geometric shapes and/or cross-sectional shapes, including, but not limited to a rectangle, a square, triangle, or other polygon, as well as a circle, an ellipse, an ovoid, or other circular or semi-circular shape. In one embodiment, a shaped opening may have one shape when a structure that includes the shaped opening is in a first configuration and a second shape, different from the one shape, when the shaped opening is in a second configuration. For example, where a shaped opening is in a sheet, when the sheet is unfolded and laid out flat, the shaped opening may have a first shape (e.g., a circle or oval) and when the sheet is in use or not laid out the form of the shaped opening may change because of the pliable nature of the sheet.

As used herein, "edge" refers to a structure, boundary, or line where an object, surface, or area begins or ends. An edge can also refer to a boundary or perimeter between two structures, objects, or surfaces. An edge can also refer to a narrow part adjacent to a border. (search "edge" on Merriam-Webster.com. Merriam-Webster, 2021. Web. 3 Aug. 2021. Modified.) In certain embodiments, an edge can be a one dimensional or a two dimensional structure that joins two adjacent structures or surfaces. Furthermore, an edge may be at a perimeter of an object or within a perimeter or boundary of an object.

"Closure" refers to any device, system, method, or apparatus to facilitate temporary and repeatable opening and closing. Closure can also refer to that which closes or shuts; that by which separate parts are fastened or closed. (Search "closure" on wordhippo.com. WordHippo, 2023. Web. Modified. Accessed Jan. 5, 2023.) As used herein, the term "closure" can include one or more modifiers that define specific types of "closure" based on the purpose, function, operation, position, or location of the "closure." As one example, a "shaped opening closure" refers to a "closure" adapted, configured, designed, or engineered to close or secure a "shaped opening." Similarly, a "slit closure" refers to a "closure" adapted, configured, designed, or engineered to close or secure a "slit."

As used herein, "end" refers to a part or structure of an area or span that lies at the boundary or edge. An end can also refer to a point that marks the extent of something and/or a point where something ceases to exist. An end can also refer to an extreme or last part lengthwise of a structure or surface. (search "end" on Merriam-Webster.com. Merriam-Webster, 2021. Web. 4 Aug. 2021. Modified.)

As used herein, "side" refers to a structure or part of a structure including, but not limited to: one of a longer bounding surfaces or lines of an object especially contrasted with the ends, a line or surface forming a border or face of an object, either surface of a thin object, a bounding line or structure of a geometric FIG. or shape, and the like. (search "side" on Merriam-Webster.com. Merriam-Webster, 2021. Web. 3 Aug. 2021. Modified.) A side can also refer to a geometric edge of a polygon (two-dimensional shape) and/or a face or surface of a polyhedron (three-dimensional shape). (Search "side" on Wikipedia.com Jul. 21, 2021. CC-BY-SA 3.0 Modified. Accessed Aug. 3, 2021.)

Side can also refer to a location on a structure. For example, a side can be a location on a structure at, or near, a furthest position away from a central axis of the structure. As used herein, the term "side" can include one or more modifiers that define and/or orient and/or distinguish the side of an object from others based on based on where and/or how the object is deployed within or in relation to a second object. For example, in the context of an implant for a patient, sides of the implant may be labeled based on where the sides are relative to the patient when the implant is deployed. As one example, an "anterior side" of an implant refers to a side that is anterior to other sides of the implant in relation to a patient when the implant is deployed in the patient.

"Activation" or "Activate" refers to an action that changes a state of an object, system, or device, from an initial state to a subsequent state. Often the initial state is one in which the object, system, or device is inert or stationary or not functioning to serve its primary purpose or function and the subsequent state is one in which the object, system, or device is active, moving, enable, and/or serving its primary purpose or function. As one example, activation of a closure refers to an action that transitions a closure from an initial state that is not serving to close a device, system, or opening to a subsequent state in which the closure then serves to close, obstruct, or restrict a device, system, or opening. As another example, activation of a fastener refers to an action that transitions a fastener from an initial state that is not serving to fasten a device(s), system(s), or opening(s) to a subsequent state in which the fastener then serves to fasten, obstruct, or restrict a device(s), system(s), or opening(s).

"Lift device" or "Lift system" refers to any device, system, method, or apparatus configured, designed, or engineered to lift or assist in the lifting or a person, animal, or other patient in need of a lift or assistance in moving from a seat, prone, supine, or other position on a floor, ground, object, or substrate. In certain embodiments, a "Lift device" or "Lift system" may be a mechanical device or system that can include motors, gears, wheels, and/or other structures to assist in a lift procedure. In other embodiments, a "Lift device" or "Lift system" may be a mechanical device or system that uses manual labor of one or more users to implement a lift procedure.

A lift device or lift system can be used to lift, drag, or otherwise move a patient from a first position on a floor, ground, object, or substrate to a new position on the a floor, ground, object, or substrate. Alternatively, a lift device or lift system can be used to lift, drag, or otherwise move a patient from a first position on a floor, ground, object, or substrate to a another object such as a bed or chair or to a standing position or to a vehicle such as a wheelchair, a gurney, a stretcher, or the like.

"Lift operation" or "Lift assist" refers to any method or method configured, designed, or engineered to facilitate or lift a person, animal, or other patient in need of a lift, or assistance in moving from a seated, prone, supine, or other position on a floor, ground, object, or substrate. In certain embodiments, a "Lift operation" can include a set of steps that may be coordinated or uncoordinated between one or more users of a "Lift device" or "Lift system".

A lift operation can be used to lift, drag, or otherwise move a patient from a first position on a floor, ground, object, or substrate to a new position on the a floor, ground, object, or substrate. Alternatively, a lift operation can be used to lift, drag, or otherwise move a patient from a first position on a floor, ground, object, or substrate to a another object such as a bed or chair or to a standing position or to a vehicle such as a wheelchair, a gurney, a stretcher, or the like.

"Reinforcement member" refers to any device, structure, object, apparatus, member, or system configured, designed, or engineered to reinforce another structure or system, to increase structural integrity, functionality, or performance of another structure or system.

"Buckle" refers to a type of fastener. In one embodiment, a buckle includes a structure or device or system, a first member, coupled to a strap, strip, or tether and configured to engage a second member. The second member can be coupled to an end or part of the same a strap, strip, or tether or coupled to another a strap, strip, tether, or structure. In certain embodiments, a buckle is an adjustable buckle or strap that is configured to enable an end or a portion of one or more straps that engage the buckle to be adjusted relative to the buckle such that a length of the one or more straps can be changed from a first length to a second length.

"Side squeeze buckle" refers to a type of fastener that can be used to couple a first strap or tether to a second strap or tether, or one part of a strap or tether to another part of the strap or tether (e.g., one end of strap to another end of the strap. Often, a side squeeze buckle includes a first member that couples to a strap or tether and a second member that couples to the same strap or tether or to another strap or tether.

In one embodiment, the first member is a female side squeeze buckle and the second member is a male side squeeze buckle. The female side squeeze buckle is configured to include an opening that accepts one or more extensions or prongs from a male side squeeze buckle. The extensions or prongs of the male side squeeze buckle may be biased or pliable and may extend such that the extension can be pressed or squeezed in a first direction such that the one or more extensions or prongs of the male side squeeze buckle can be inserted into one or more openings in the female side squeeze buckle. After inserting the one or more extensions or prongs of the male side squeeze buckle into the one or more openings in the female side squeeze buckle the one or more extensions or prongs can be released and the one or more extensions or prongs spring back or return to a position before being pressed or squeezed. In this position, the one or more extensions or prongs may be retained by the female side squeeze buckle. In this manner, in one embodiment, the female side squeeze buckle can engage and retain the male side squeeze buckle. Decoupling the female side squeeze buckle from the male side squeeze buckle may simply be a reverse process. The one or more extensions or prongs can be squeezed or pressed and the male side squeeze buckle separated from the female side squeeze buckle.

As used herein, a "spring" or "biasing member" refers to an elastic structure that stores mechanical energy. Springs can be made of a variety of elastic material such as spring steel and can be cylindrical and/or helical in shape. Various types of springs can be used including coil springs, torsion springs, and the like. (Search "spring (device)" on Wikipedia.com Nov. 28, 2020. Modified. Accessed Jan. 6, 2020.) One example of a biasing member is an elastic strap.

"Closure force" refers to a force sufficient to close, restrict, or draw one structure closer to another. In the present disclosure, a closure force may be applied by a biasing member on an edge or near and edge of a shaped opening or a slit such that the closure force causes the edge to move closer to a corresponding edge or part.

As used herein, a "marking" or "marker" refers to a symbol, letter, lettering, word, phrase, icon, design, color, diagram, indicator, FIG., or combination of these designed, intended, structured, organized, configured, programmed, arranged, or engineered to communication information and/or a message to a user receiving, viewing, or encountering the marking. The marking can include one or more of a tactile signal, a visual signal or indication, an audible signal, and the like. In one embodiment, a marking may comprise a number or set letters, symbols, or words positioned on a surface, structure, color, color scheme, or device to convey a desired message or set of information.

"Patient" refers to a person or animal that is in need of assistance or care. Those providing the care or assistance or standing ready to provide the assistance can include a counselor, a friend, a relative, a doctor, a nurse, a first responder such as an Emergency Medical Technician (EMT), Emergency Medical Service (EMS) provider, or the like.

"Midpoint" refers to a point along a structure, object, component, plane, or line that is midway between opposite ends of the structure, object, component, plane, or line.

"Body part" refers to a part of a body of a person, animal, or patient. In the present disclosure, a body part refers to a part of a patient's body that is contact with a floor, ground, or other object. In particular, where a patient has fallen from a lying, seating, or standing position and is resting on the floor, ground, or another object, the body part refers to the one or more parts of a patient that are in contact with the floor, ground, or other object. Often, in a fall scenario, a body part may include one or more of a hip, abdomen, buttocks, thigh, knee, lower back, torso, or the like.

"Floor" refers to any surface upon which a patient may be resting, sitting, lying, or kneeling. Examples of floor, as used in this disclosure include a floor, a ground, a bed, a wall, a piece of furniture, a vehicle, and the like.

"Shaped opening fastener" refers to a fastener designed, engineered, or configured to fasten, close, restrict, and/or provide fastener functionality for a shaped opening. Examples of a shaped fastener include, but are not limited to, a strap, a buckle, a tie, a tether, or the like.

The present disclosure discloses an apparatus, device, system, and/or method for lifting a patient. Conventional devices and methods can be unworkable when a patient is on a floor in a confined space. Alternatively, or in addition, ingress and/or egress of a building from where the patient is on the floor can be constricted and limited due to narrow doorways, halls, entries, and the like. Such confined spaced render conventional backboards, stretchers, and/or gurneys ineffective or impractical. What is needed is an apparatus, device, system, and/or method that can effectively be used to lift a patient from a floor in a confined tight space. The present disclosure provides one example for use in such situations.

FIG. 1 is a perspective view of an example scenario 100 of a patient desiring assistance. FIG. 1 illustrates a room 102 with a bed 104, three walls 106*a*, 106*b*, 106*c*, a floor 108 and a patient 110. The room 102, bed 104, wall 106*a*, wall 106*b*, wall 106*c*, and floor 108 are but one example of structures and furniture that can form narrow, tight, or confined spaces that a patient can be in and in need of a lift assist.

In the scenario 100, a patient 110 may be seated on the floor 108 between the bed 104 and wall 106*c*. The patient 110 may have fallen to the position 112 illustrated in FIG. 1 or may have intentionally gotten between the bed 104 and the wall 106*c* and then determined that they cannot move themselves out from between the bed 104 and the wall 106*c* or move to a seated or standing position in the room 102. Typically, a patient 110 is seated on the floor 108 are and unable to get move themselves along the floor 108 or to a seated, kneeling, or standing position.

In FIG. 1, the patient 110 is seated with their one or more buttocks and/or feet and/or legs resting on the floor 108. Those of skill in the art will appreciate that the patient 110 can have a variety of positions on the floor and thus a variety of body parts may be resting or in contact with the floor 108. For example, a hip, part of the legs, part of the torso, the back, side or other body parts of a patient 110 can be resting on the floor 108. Similarly, the patient 110 may be seated, kneeling, prone, supine on the floor 108.

When a patient 110 finds themselves in position 112, the patient 110 may first attempt to move out of the position and/or to sit up, kneel, and or stand up. However, the condition of the patient 110 and/or objects surrounding the patient 110 may prevent them from standing, sitting, kneeling, getting on the bed 104 or moving from position 112. For example, the patient 110 may have been injured in a fall to the floor 108 to position 112. Alternatively, or in addition, the patient 110 may suffer from certain physical conditions that limit their mobility or ability to move or sit up or stand from position 112. For example, the patient 110 may be missing a extremity, a hand, a foot, may have excessive weight, may be experiencing pain, may have weak or incapable hip, leg, or foot joints, may be wedged between the bed 104 and the wall 106*c* (for example), may be unconscious, or may have some other condition that prevents or limits their ability to move from position 112 and/or sit or stand. Those of skill in the art will appreciate the patient 110 may have a variety of conditions that limited or prevent the patient 110 from moving from, standing from, or leaving position 112.

When the patient 110 recognizes that they cannot move from position 112 without help or assistance, they may call for help or assistance. Or, assistance may be called or sent. A patient or another may request lift assistance or a lift operation. In certain situations, the patient 110 may request assistance from another person such as a family member, friend, neighbor, or stranger. This other person may also be unable to help the patient 110 move from the position 112. And/or the other person alone may not have sufficient skills or strength to assist the patient 110 is moving from the position 112 or standing. Alternatively, or in addition, the patient 110 or another person may request assistance from emergency personnel, first responders, paramedics, and/or emergency medical technicians (EMTs).

When the other person, persons, or emergency personnel arrive, they may assess the situation to determine how best to help the patient 110. Emergency responders may have limited space to work in to provide a lift assist. Furthermore, people who are prone to falls and not capable of standing themselves up or getting out of a tight space may have physical or medical conditions that inhibit or prevent them from standing on their own or moving out of the tight space. Often, a patient 110 stuck with their behind or hip on the floor. A patient 110 may not be able to lift the part of their body contacting the floor. This may be due to a weight of the patient 110, weak muscles of the patient 110, and/or a medical/health condition of the patient 110. Maneuvering a flexible lift device under the patient can be difficult, impractical, and/or impossible.

In certain scenarios, those assisting may not be able to, or may choose not to, pull the patient 110 using their arms or legs to prevent injuring or further injuring or causing pain to the patient 110. EMS personnel or other first responders may be trained to normally position a patient 110 such that the patient 110 can be rolled onto a tarp, stretcher or the like. However, the scenario 100 makes such a procedure for rolling a patient or otherwise getting a tarp or sheet under the patient too challenging or impractical. Advantageously, one or more embodiments of the present disclosure can be used to perform a lift operation on the patient 110. In particular, the present embodiments of the present disclosure can be used to perform a lift operation on the patient 110 without rolling the patient or moving the patient prior to the lift operation.

Figure 2:
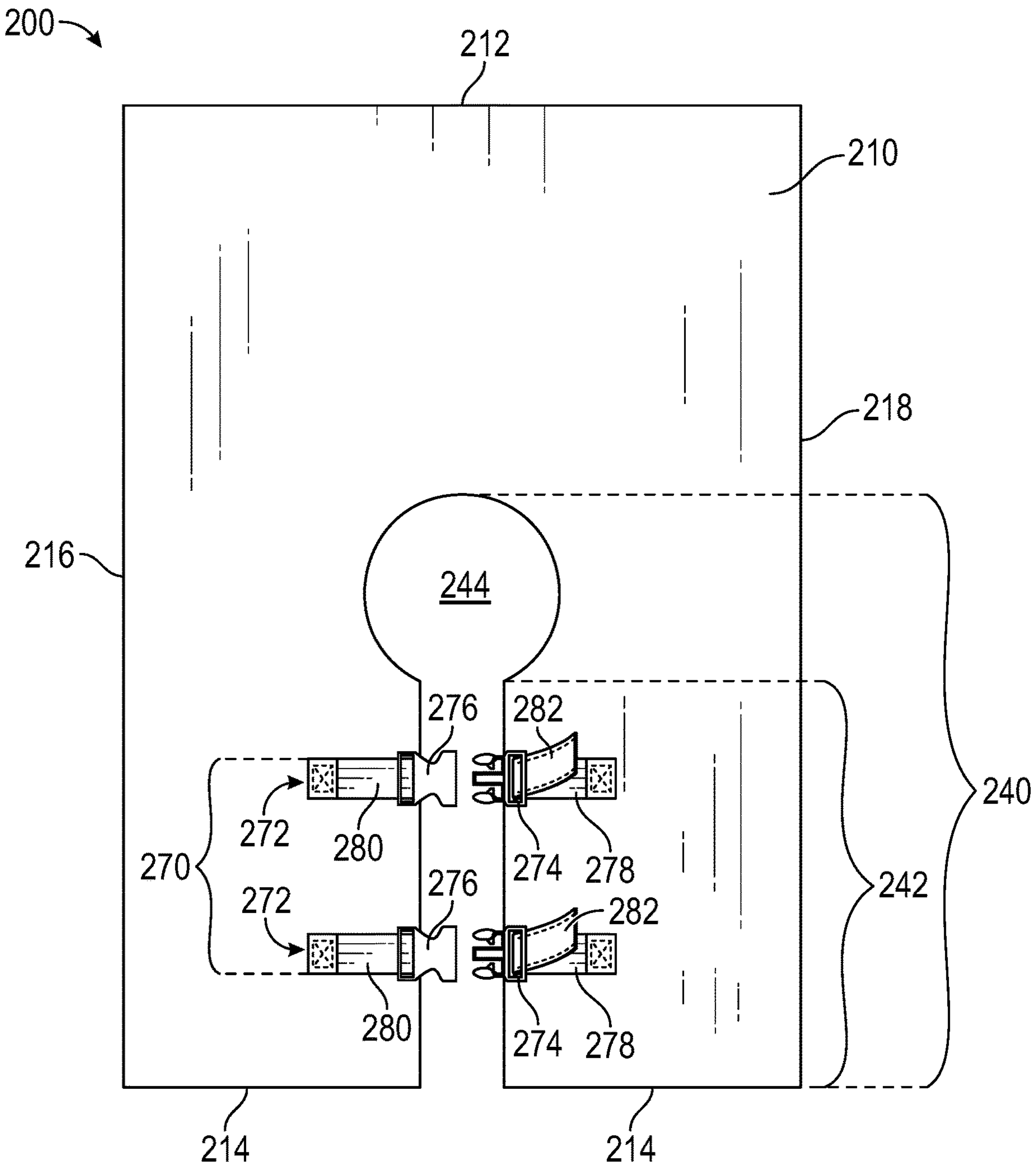
FIG. 2 is a plan view of an example lift device, according to one embodiment.

FIG. 2 is a plan view of an example lift device 200, according to one embodiment. The lift device 200 is one example of an embodiment that can be used to lift a patient. In particular, the lift device 200 can be used in the scenario 100 of FIG. 1. The lift device 200 includes a sheet 210, an opening 240, and a closure 270.

The sheet 210 serves as a main body or structure for the lift device 200. The sheet 210 can be pliable and/or flexible. The sheet 210 can be of any size. In certain embodiments, the sheet 210 is large enough to surround a patient 110 before or during a lift operation. For example, the sheet 210 can have a length of between about 5-7 feet and a width of between about 3-4 feet. In certain embodiments, the sheet 210 is larger than the height and/or width of the patient 110 or a set of potential patients. Generally, if the sheet 210 is larger than the patient 110 this is not a problem and does not interfere with the lift operation.

The sheet 210 can be of a variety of shapes and sizes. For example, the sheet 210 may be a rectangle, square, triangle, or other polygon. Similarly, the sheet 210 can be round, circular, oval. Alternatively, or in addition, the sheet 210 can include both straight and/or curved edges. In the illustrated embodiment, the sheet 210 includes a top edge 212, a bottom edge 214, a left edge 216, and a right edge 218.

The sheet 210 is durable and may be reinforced across one or more surfaces of the sheet 210 and/or edges of the sheet 210. A sheet 210 can be made of a variety of materials including, but not limited to, cloth, fabric, polyester, canvas, leather, nylon, polyethylene, polypropylene. The sheet 210 can be of one layer or multiple layers. The material of a sheet 210 can be a single material or a weave or braid of threads, tethers, or straps of a single material or a combination of materials. Examples, of sheets include, but not limited to, tarps, blankets, covers, and the like. A sheet 210 can be water-proof, water-resistant, stain-resistant, fire-proof, fire-resistant, or the like depending on the composition, structure, configuration, and/or material of the sheet.

In certain embodiments, the lift device 200 and/or sheet 210 includes an opening 240. In one embodiment, the opening 240 extends from an edge of the sheet 210. In the illustrated embodiment, the opening 240 extends from the bottom edge 214. An opening 240 that extends from an edge of the sheet 210 facilitates positioning the sheet 210 around a patient 110 prior to, during, or as part of, a lift operation. One goal of a lift operation may be to get the patient 110 onto the sheet 210 while requiring minimal movement or effort from the patient 110. An opening 240 that extends from an edge of the sheet 210 facilitates accomplishing this goal.

Often, the need for the lift operation is due to the patient 110 having sever immobility such that the patient may not be able to even lift, raise, roll, or move one or more of their body parts off of the floor. With an opening 240 that extends from an edge of the sheet 210, the patient 110 does not need to raise the body part off the floor for the lift operation using the lift device 200 to be successful.

The length, size, shape, and configuration of the opening 240 can vary in different embodiments. In the illustrated embodiment, the opening 240 extends from the bottom edge 214 to approximately the midpoint of the top edge 212. Having the opening 240 extend to or near a midpoint can be advantageous because this can facilitate positioning a patient 110 at, or near, a center of the sheet 210 such that the patient 110 remains within, or on a surface of, the sheet 210 during a lift operation. One goal of the lift operation may be to not drop the patient 110 and another goal may be to not further injure or frighten the patient 110. Having the patient 110 centered within or upon the sheet 210 can help in meeting one or more of these goals by keeping the patient 110 stable during the lift operation.

In the illustrated embodiment, the opening 240 includes a slit 242 that extends from an edge of the sheet 210 and a shaped opening 244. In one embodiment, the opening 240 can include only the slit 242. In one embodiment, the opening 240 can include only the shaped opening 244. In another embodiment, the opening 240 can include a slit 242 and at least a shaped opening 244.

In the illustrated embodiment, the slit 242 is connected to the shaped opening 244 and the slit 242 extends from the bottom edge 214. Of course, those of skill in the art will appreciate that the opening 240 can include only a slit 242. Alternatively, or in addition, the opening 240 can extend from any edge of the sheet 210. In certain embodiments, the shaped opening 244 can serve as a relief for the slit 242 such that stresses or strains on the slit 242, edges of the slit, and/or sheet 210 can be managed and the opening 240 is not damaged during one or more lift operations.

In another embodiment, the lift device 200 and/or sheet 210 includes an opening 240 and a shaped opening 244. The shaped opening 244 can be within a perimeter of the sheet 210. The shaped opening 244 can be connected to the opening 240.

In the illustrated embodiment, the shaped opening 244 is positioned approximately to include a midpoint of the sheet 210. The shaped opening 244 can be within a perimeter of the sheet 210. In the illustrated embodiment, the shaped opening 244 is approximately centered with respect to the top edge 212, bottom edge 214, left edge 216, and right edge 218. Having the shaped opening 244 centered can help provide a secure and stable lift for the patient 110.

The slit 242 can have various configurations. In one embodiment, the slit 242 is straight. In another embodiment, the slit 242 can be curved. In yet another embodiment, the slit 242 can have a zig-zag shape.

In the illustrated embodiment, the shaped opening 244 is in the shape of a circle. Of course, the shaped opening 244 can have a variety of shapes, including but not limited to, oval, square, triangle, rectangle, another polygon, or the like. The opening 240 serves to facilitate positioning the sheet 210 around one or more body parts of a patient 110 that are resting on a floor or ground. Similarly, the shaped opening 244 can also serve to facilitate positioning the sheet 210 around one or more body parts of a patient 110 that are resting on a floor or ground.

The size and shape of the shaped opening 244 can be defined to comfortably circumscribe a body part (e.g., buttocks, thigh(s), legs, torso, back, etc.) of a patient 110 that is contact with a surface of a floor or ground. In one embodiment, the shaped opening 244 has a diameter of between about 6 inches and about 12 inches. The shaped opening 244 can have a diameter smaller than about 6 inches and/or can have a diameter larger than about 12 inches. In certain embodiments, the shaped opening 244 includes a diameter greater than an area of contact of one or more body parts of a patient 110 and a floor or ground. The shaped opening 244 can include one or more edges and the edges may be reinforced with stitching, straps, other fabric, a seam, or the like.

The closure 270 serves to close, at least partially, one or more portions, edges, or parts of the opening 240. In certain embodiments, the closure 270 can completely close the opening 240. Closing the opening 240 about the patient 110 facilitates placement of the patient 110 on the sheet 210 for a lift operation.

Activation of the closure 270 may at least partially close the opening 240. Deactivation of the closure 270 may at least partially open the opening 240. Advantageously, the closure 270 is configured to be selectively opened/activated and/or selectively closed/deactivated. In certain embodiments, the closure 270 can be configured to close both a slit 242 and a shaped opening 244, just the shaped opening 244, and/or just the slit 242. Advantageously, the closure 270 is configured to open or close the opening 240. In this manner, the opening 240 can be opened for initial stages of a lift operation and closed for subsequent stages of the lift operation.

In one embodiment, the present disclosure includes a lift system for lifting a patient. The lift system may include a sheet, such as sheet 210 having a first edge, such as top edge 212, a second edge opposite the first edge, such as bottom edge 214. The first edge and second edge can be parallel. The sheet 210 can also include a third edge, such as left edge 216 and a fourth edge, such as right edge 218 that is opposite and parallel to the third edge. The lift system can also include a shaped opening, such as shaped opening 244 within a perimeter of the sheet, such as sheet 210. The lift system can also include a slit, such as for example slit 242 that extends from the fourth edge and connects to the shaped opening. The lift system can also include a closure, such as for example closure 270 that at least partially closes the shaped opening and/or the slit when the closure is activated. It should be noted that in certain embodiments the closure may at least partially close a shaped opening and a the slit.

In the illustrated embodiment, the closure 270 includes one or more, or a plurality of fasteners 272. One or more of the fasteners 272 can be configured to extend across the opening 240. In the illustrated embodiment, the fasteners 272 are configured to extend across the slit 242. In certain embodiments, one or more fasteners 272 or other structure can extend across a shaped opening 244.

Those of skill in the art will appreciate that the fasteners 272 of the illustrated embodiment are but examples of a variety of types of one or more fasteners 272 that can be used in different embodiments of lift device 200. Examples of such alternative fasteners 272 include, but are not limited to, snaps, eyelets and laces or a tether that can cross the slit 242, Velcro® (hook and loop fasteners), zippers, and the like, or a combination of these. Those of skill in the art will also appreciate that features of one member of a fastener 272 can be implemented on one side of the fastener, on the other side of the fastener, or on both sides of the fastener.

Alternatively, or in addition, the fasteners 272 of a closure 270 can be of the same type and similar in length, functionality and configuration. Or, the fasteners 272 of a closure 270 can vary in type, length, functionality and configuration. All such combinations and/or permutations are within the scope of the present disclosure.

In one embodiment, the fasteners 272 are reusable such that the fasteners 272 can be repeatedly opened (unfastened) and closed (fastened). In certain embodiments, the fasteners 272 are adjustable such that one or more fasteners 272 can be adjusted from a first length to a second length. The first length can be longer than the second length and/or the first length can be shorter than the second length.

In the illustrated embodiment, a fasteners 272 can include a first member 274, and a second member 276. The first member 274 and/or the second member 276 can be configured to releasably engage each other. For example, the second member 276 can be configured releasably engage the first member 274.

In the illustrated embodiment, the first member 274 may be a buckle or a part of a buckle and the second member 276 may a buckle or may be a corresponding part of the buckle. For example, the first member 274 may be a male side squeeze buckle and the second member 276 may be a female side squeeze buckle, or vice versa. The first member 274 can releasably engage with the second member 276.

In one embodiment, the fasteners 272 includes a first strap 278 connected or coupled to the first member 274 and a second strap 280 connected or couple to the second member 276. In certain embodiments, one or the other or both of the first strap 278 and the second strap 280 can be adjustably coupled or connected to one of the first member 274 and the second member 276.

In the illustrated embodiment, the first strap 278 is adjustably connected or coupled to the first member 274. The first strap 278 can include an end 282 that extends from the first member 274 when the first strap 278 engages the first member 274. Advantageously, a user can adjust a length of the first strap 278 used for the closure 270 by sliding the first strap 278 through the first member 274 such that the end 282 is closer to the first member 274. In this manner, the user can increase the length of the first strap 278 for the closure 270. Similarly, a user can adjust a length of the first strap 278 used for the closure 270 by sliding the first strap 278 through the first member 274 such that the end 282 is further away from the first member 274. In this manner, the user can decrease the length of the first strap 278 for the closure 270.

A closure 270 with one or more adjustable length fasteners 272 can facilitate activation of the closure 270 during a lift operation. For example, one or more adjustable length fasteners 272 can be extended to their maximum lengths, and/or one side of a fastener can be disconnected from a corresponding side to facilitate positioning the sheet 210 around one or more body parts of a patient 110 during a lift operation. Next, one or more buckles or members of the one or more fasteners can be connected or engaged, while adjustable length fasteners 272 are at extended lengths. Next, a user can activate the closure 270 can close off an opening 240 by adjusting the fasteners 272 to a shorter length. In certain embodiments, adjusting the adjustable length fasteners 272 can draw the slit 242 and/or a shaped opening 244 partially or completely closed for a next stage of a lift operation.

In another embodiment, a fastener 272 a can include a first member 274 and a second member 276 configured to releasably engage the first member 274. For example, in one embodiment the first member 274 can be a strap secured to the sheet 210 and the second member 276 can be a cam buckle (not shown). A cam buckle is a type of buckle configured to accept an end, such as end 282 of a strap such as first strap 278 that is threaded through the cam buckle. The cam buckle includes a biased clamp or set of teeth that engage the first strap 278. The biased clamp can be disengaged/released such that the cam buckle can be threaded further along a length of the first strap 278 and then the biased clamp can be engaged/unreleased to engage the first strap 278 an restrain the first strap 278 from reverse threading relative to the cam buckle. A fastener 272 that includes a strap and a cam buckle can also provide an adjustable fastener for the closure 270.

Figure 3A:
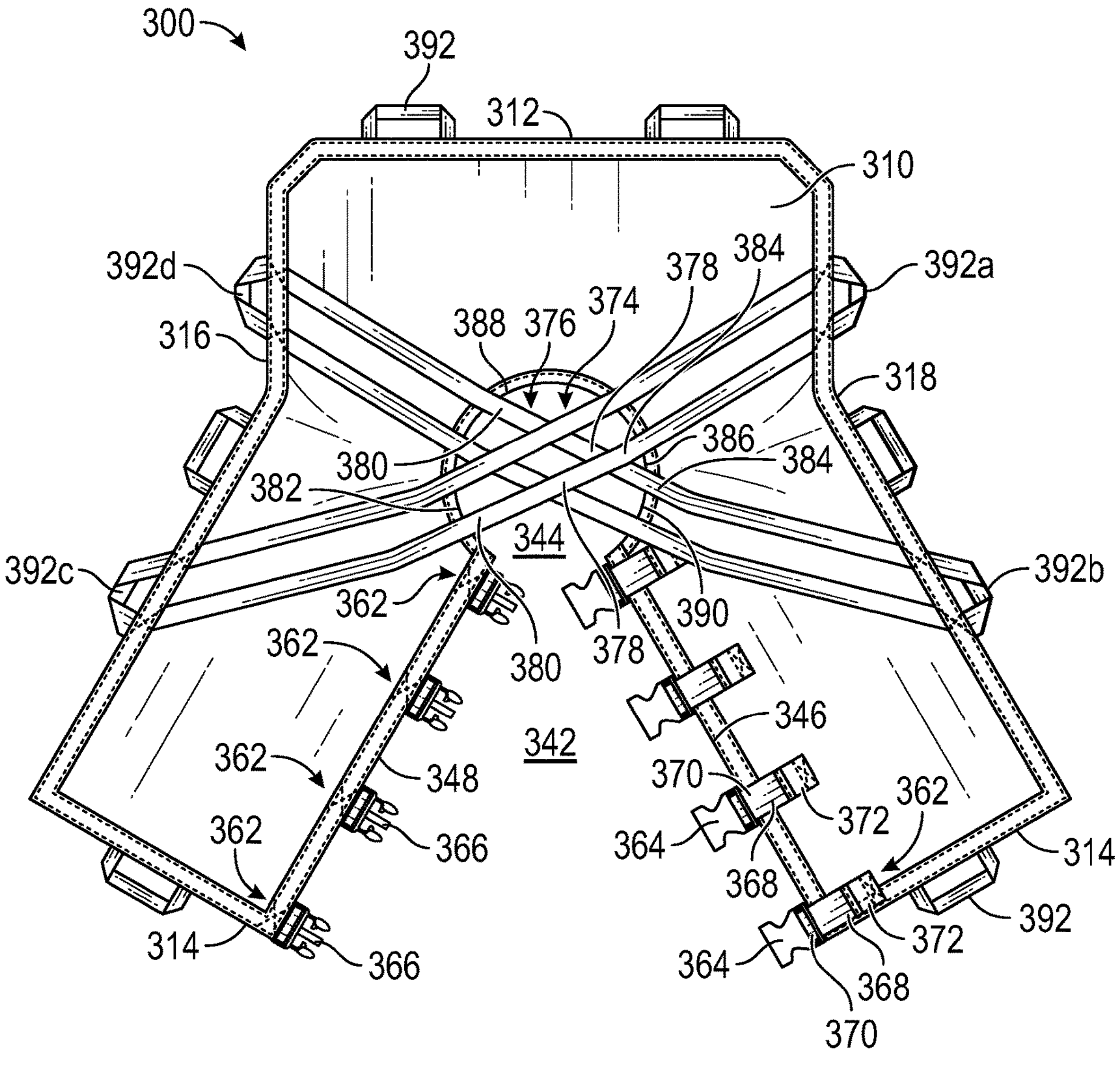
FIGS. 3A and 3B are plan views of a lift device, according to one embodiment.
Figure 3B:
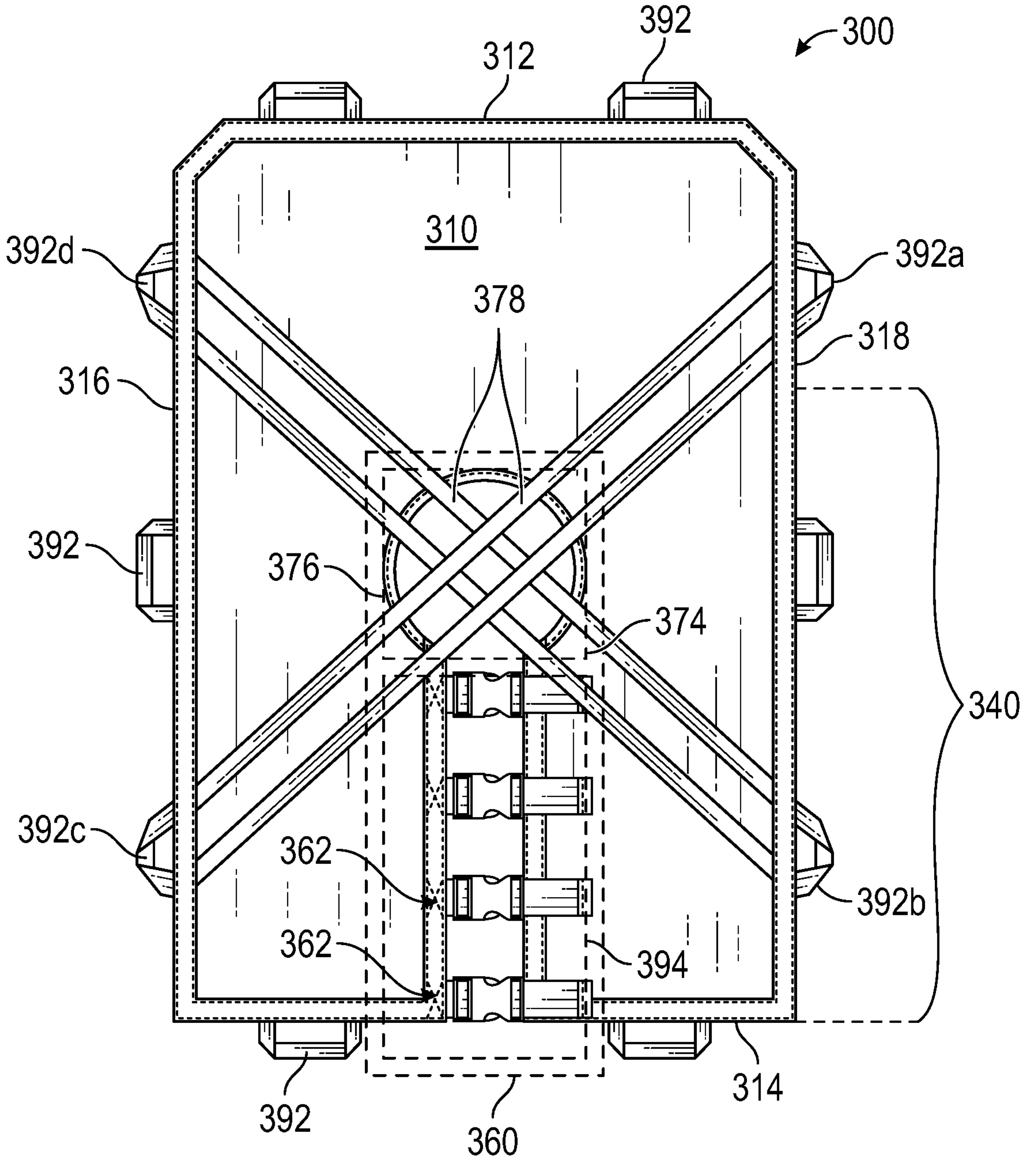

FIGS. 3A and 3B are plan views of a lift device 300, according to one embodiment. The lift device 200 includes a sheet 310, an opening 340, and a closure 360. While the lift device 300 is a different embodiment, one or more of the components of the lift device 300 may include similar or the same features, attributes, functionality, and/or characteristics of like numbered components (e.g., 200 level parts numbers) of the lift device 200. Alternatively, or in addition, the lift device 300 may include additional features, attributes, functionality, and/or characteristics.

FIG. 3A illustrates an opening 340 that includes a first opening edge 346 and a second opening edge 348 opposite the first opening edge 346. In one embodiment, the first opening edge 346 and second opening edge 348 are opposite edges of a slit 342. In another embodiment, the first opening edge 346 may connect to the second opening edge 348 by way of an edge of a shaped opening 344. In one embodiment, a single opening edge may circumscribe the opening 340.

In the illustrated embodiment of FIG. 3A, the closure 360 may include one or more or a plurality of fasteners 362. Each of or one or more of the fasteners 362 may be spaced along a length of the opening 340, such as, for example, slit 342. Each of or one or more of the fasteners 362 can include a first member 364 and a second member 366 and a strap 368. The strap 368 may include a first end 370 coupled to the first member 364 and a second end 372 coupled to the sheet 310 near the first opening edge 346. The second member 366 may be coupled to the sheet 310 near the second opening edge 348. In certain embodiments, the fasteners 362 includes an adjustable fastener configured to adjust from a first length to a second length. The first length may be shorter than the second length, or vice versa.

FIG. 3A illustrates one example embodiment in which the lift device 300 includes a shaped opening closure 374. The shaped opening closure 374 may be separate and independent of, or part of, the closure 360 (see FIG. 3B). The shaped opening closure 374 is a type of closure designed/configured to at least partially close a shaped opening 344 when the shaped opening closure 374 is activated. In one embodiment, the shaped opening closure 374 is configured to close just the shaped opening 344. In another embodiment, the shaped opening closure 374 is configured to close both the shaped opening 344 and the slit 342.

In the illustrated embodiment, the shaped opening closure 374 includes one or more shaped opening fasteners 376. The shaped opening fasteners 376 may traverse or may be configured to traverse the shaped opening 344 before, or as, the shaped opening closure 374 is activated. In the illustrated embodiment, the shaped opening closure 374 includes a plurality of shaped opening fasteners 376 that traverse or are configured to traverse the shaped opening 344. In one embodiment, the shaped opening closure 374 can include at least one strap 378.

In one embodiment, each shaped opening fastener 386 can include a strap 378 connected at a first end 380 to one side 382 of the shaped opening 344 and connected at a second end 384 to an opposite side 386 of the shaped opening 344. In one embodiment, the first end 380 is connected to a first edge 388 of the shaped opening 344 and the second end 384 is connected to a second edge 390 approximately opposite the first edge 388. Alternatively, or in addition, the first end 380 and/or the second end 384 may not be connected to an edge of the shaped opening 344, instead the first end 380 and/or second end 384 can be connected to one or more handles 392.

The strap 378 may be flexible or pliable such that distortion of the shape of the shaped opening 344 can move the strap 378 to one side of the shaped opening 344, particularly when a slit 342, connected to the shaped opening 344, is enlarged. The straps 378 can be moved to one side by a user deploying the lift device 300.

Conversely, as the shaped opening 344 is distorted to bring sides of the shaped opening 344 closer to each other (and/or the first opening edge 346 is brought closer to the second opening edge 348), the strap 378 slides towards a center of the shaped opening 344 to provide at least partial closure of the shaped opening 344. As multiple straps 378 slide towards a center of the shaped opening 344 the shaped opening 344 is closed off.

In the illustrated embodiment, the shaped opening fastener 376 includes a plurality of straps 378. The straps 378 may be independent of each other and connect opposite sides of the shaped opening 344. Alternatively, or in addition, the straps 378 may be associated with each other to facilitate closing the shaped opening 344. For example, the straps 378 can be interwoven with each other to facilitate closing the shaped opening 344. Alternatively, or in addition, the straps 378 may be connected to each other where they overlap, such as with stitches.

In the illustrated embodiment, the sheet 310 can include three or more edges (e.g., top edge 312, bottom edge 314, left edge 316, and right edge 318). One or more of the straps 378 may be coupled to a handle 392 (e.g., handle 392*a*, handle 392*b*, handle 392*c*, handle 392*d*) near an edge of the sheet 310, in particular near an edge that does not include the opening 340. (e.g., left edge 316 and right edge 318). Alternatively, or in addition, the straps 378 can be connected to the sheet 310, for example by stitches. The straps 378 can form the handles 398. In addition, the lift device 300 can include a plurality of handles 398 around the edges. The handles 398 can provide a strategic and/or convenient location for a user, such as an emergency responder, to hold the sheet 310 during a lift operation.

FIG. 3A illustrates a configuration of the lift device 300 in which the closure 360 is inactivated such that the opening 340 is wide near a bottom edge 314 and narrows towards the shaped opening 344. In the illustrated configuration, the lift device 300 is able to encircle one or more body parts of a patient 110 on a floor or ground. Specifically, the sheet 310 can circumscribe the parts of the patient 110 resting on the floor. The sheet 310 can be positioned on a floor or object adjacent to the patient 110 and the opening 340 can be positioned where parts of the patient 110 are resting on the floor, ground, or another object.

FIG. 3B illustrates a configuration of the lift device 300 in which the closure 360 is activated such that the opening 340 is narrow near a bottom edge 314 and remains narrow towards the shaped opening 344. In FIG. 3B, the closure 360 closes off the opening 340 such that a patient 110 positioned on the sheet 310 can be lifted securely and stably as one or more users lift the sheet 310. Each of the fasteners (e.g., the fasteners 362 and/or the shaped opening fasteners 376) are activated and/or engaged and serving to close off the opening 340. In one embodiment, as edge of the lift device 300 are pulled, the shaped opening fasteners 376 may move and at least partially close off the shaped opening 344.

In one embodiment, use of the lift device 300 can activate one or more closures 360/374. For example, one user pulling on handle 392*a* and handle 392*b* and another user pulling on handle 392*c* and handle 392*d* can put tension force in one or more straps 378 connected to the handles 392. This tension force can cause multiple straps 378 to move towards a center of the shaped opening 344 which closes off the shaped opening 344. In this manner, use of the lift device 300 can activate one or more closures of the lift device 300.

During a lift operation, the shaped opening 344 may experience high stress and strain. Therefore, in certain embodiments, an edge of the shaped opening 344, such as first edge 388 and/or second edge 390 can include a reinforcement member 396. The reinforcement member 396 adds strength and durability to the edge to mitigate damage or failure. A variety of structures can serve as the reinforcement member 396. In one embodiment, the reinforcement member 396 is reinforcement stitching. In another embodiment, the reinforcement member 396 is a strap sewn around the edge.

Alternatively, or in addition, a user can engage one or more fasteners 362 of a slit closure 394 (See FIG. 3B). The slit closure 394 may be a closure that is configured to close a slit 342. In one embodiment, the slit closure includes at least one fastener 362 having a first member 364 and a second member 366 configured to releasably engage the first member 364. For example, the first member 364 can be a strap and the second member 366 can be a cam buckle.

Ideally, each of the fasteners 362 is engaged to fully close the slit 342. Alternatively, or in addition, one or more fasteners 362 closest to a midpoint of the sheet 310 can be engaged and the lift device 300 can still be effectively used to lift a patient 110 even though all fasteners 362 may not have been engaged. Since less weight of a patient 110 is, or will be, near the fasteners 362 closest to the bottom edge 314, engagement of the fasteners 362 closest to the bottom edge 314 may not be essential for an effective lift operation.

Figure 4A:
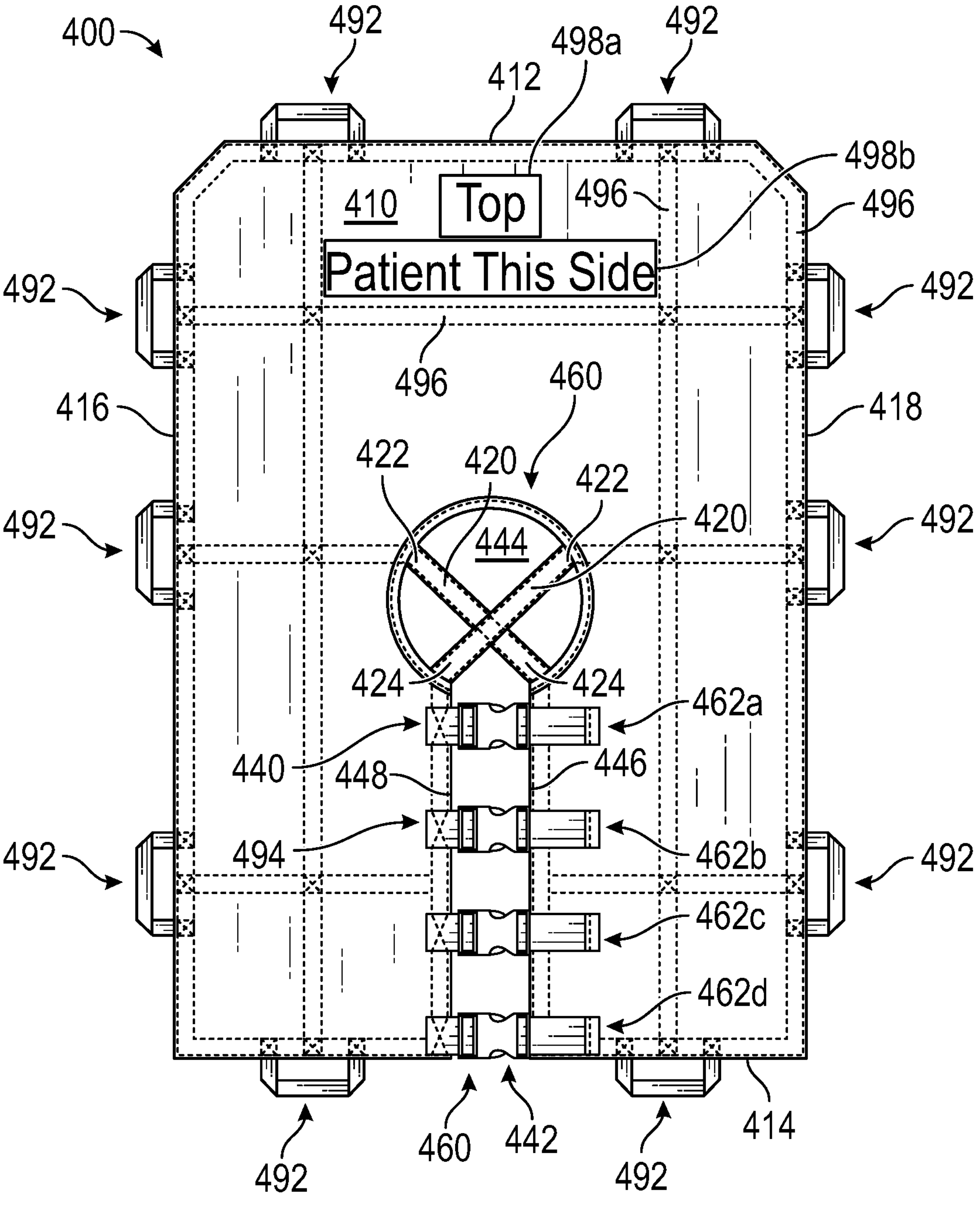
FIGS. 4A and 4B are plan views of a lift device, according to one embodiment.
Figure 4B:
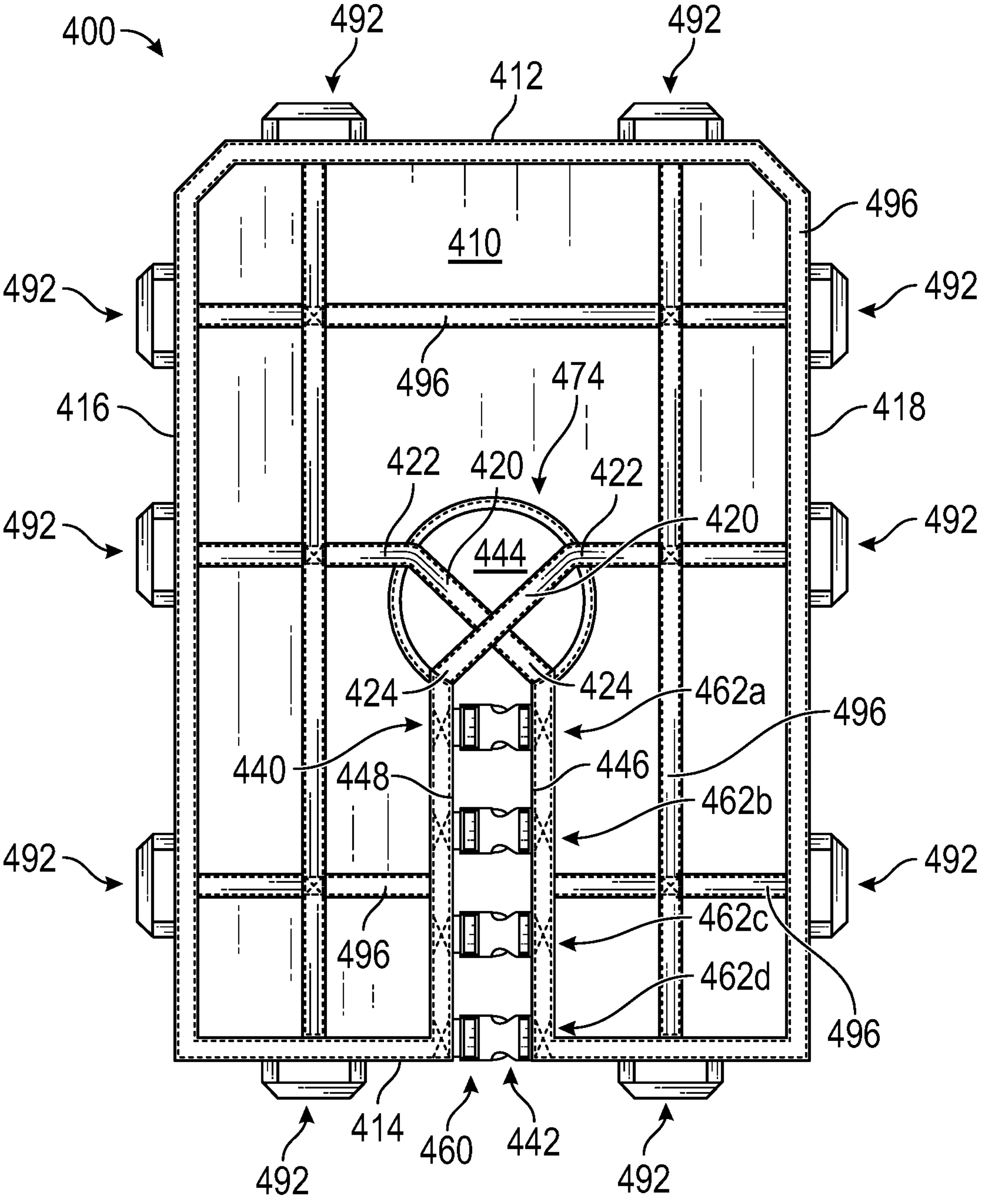

FIGS. 4A and 4B illustrate plan views of an alternative embodiment for lift device/system, lift device 400. The lift device 400 may have many structures, features, and functions, operations, and configuration similar or identical to those of the lift device 200 or lift device 300 described in relation to FIGS. 2-3B, like parts are identified with the same reference numerals, except the first digit of the reference number is changed for this embodiment. FIG. 4A is a front view of the lift device 400 and FIG. 4B is a back view of the lift device 400.

Accordingly, the lift device 400 may include a sheet 410, opening 440, and at least one closure 460. One difference between the lift device 400 and the lift device 200 or lift device 300 may be in the use and kind of closure 460 and/or shaped opening closure 474. In the illustrated embodiment, the closure 460 and/or shaped opening closure 474 includes one or more biasing members 420.

The biasing members 420 may serve as part of a closure 460 and/or part of a shaped opening closure 474. The biasing members 420 facilitate closing the opening 440, such as the slit 442 and/or the shaped opening 444. In the illustrated embodiment, the biasing members 420 can extend across the shaped opening 444 and aid in narrowing or closing the shaped opening 444 and/or the slit 442.

In one embodiment, the biasing members 420 is embodied as a shaped opening fastener 476. The biasing members 420 can be an elastic band, elastic member, and/or elastic strap. The biasing members 420 can include a first end 422 and a second end 424. The first end 422 can connect to the sheet 410. The second end 424 can connect to one of an edge 426 of the shaped opening 444 or an edge 426 of the slit 442. Alternatively, the second end 424 can connect to edge 426 of both the shaped opening 444 and the slit 442. In one embodiment, the edge 426 of shaped opening 444 and/or the slit 442 is opposite where the biasing member 420 connects or is connectable to the sheet 410.

In one embodiment, the biasing member 420 is configured to apply a closure force on the one edge 426 of the shaped opening 444 or the slit 442 in response to the one edge 426 of the shaped opening 444 or the slit 442 being moved away from another edge of one of the shaped opening 444 and/or the slit 442. In one example, the biasing members 420 can be activated, or create the closure force, by a user widening or opening up the opening 440, such as by widening the slit 442. Once the opening 440 is widened the closure force can act to encourage closure of the opening 440. This action is automatic and can assist a user in positioning and arranging the sheet 410 around a patient 110 for a lift operation.

In certain embodiments, the fasteners 462 can include one or more markings (not shown) to assist users in activating the closure 460 for a lift operation. The markings may be used to ensure that one first member 464 is properly coupled to a corresponding second member 466 of a fastener 462. For example, the first member 464 or second member 466 can be marked with an alphanumeric symbol and the other of the first member 464 or second member 466 can be marked with another corresponding alphanumeric symbol (e.g., "1" may be marked on both a first member 464 and a second member 466). Or, a geometric symbol or shape can be marked on both a first member 464 and a second member 466. Or, a color can be marked on both a first member 464 and a second member 466. A user can be trained to look for the corresponding markings on the first member 464 and the second member 466 and match these up to operate or activate the closure 460. In certain embodiments, the markings facilitate activation of the closure 460 and/or the slit closure 494.

Alternatively, or in addition, the markings can serve to ensure that coupling of certain fasteners 462 have, or are given, priority over coupling of other fasteners 462. For example, fasteners 462 closer to the center of the sheet 410 may be color coded to encourage coupling of these fasteners first or before a lift operation is attempted. For example, fastener 462*a* may be color coded "red" to indicate that this fastener 462*a* should be coupled before attempting a lift operation. Fastener 462*b* may be color coded "yellow" to indicate that coupling this fastener 462*a* is advisable before attempting a lift operation. Fasteners 462*c* and 462*d* may be color coded "green" to indicate that coupling these fasteners 462*c* and 462*d* is advisable, but optional, before attempting a lift operation.

Those of skill in the art will appreciate that the examples of alphanumeric symbols, geometric symbols, and/or colors are but a few of a number of other types and/or kinds of markings that can be used to facilitate operation of fasteners 462. The present disclosure is not limited to these examples. The present disclosure includes other markings within the scope of the claims.

In the illustrated embodiment, the lift device 400 includes one or more reinforcement members 496. The one or more reinforcement members 496 can extend across at least a portion of the sheet 410. The one or more reinforcement member 496 provide added strength, stability, and durability to the lift device 400/sheet 410. A variety of implementations for the reinforcement member 496 can be used including added layers to the sheet 410.

In the illustrated embodiment, the reinforcement member 496 includes a strap that extends from one edge to an opposite edge (e.g., top edge 412 to bottom edge 414, or left edge 416 to right edge 418). Alternatively, or in addition, a reinforcement member 496 may be connected to an edge around the sheet 410. The reinforcement member 496 can be secured to the sheet 410 using a variety of techniques and/or technologies including heat welding, glues, stitching, and the like. In FIG. 4A, the position of reinforcement members 496 can be identified by stitching that shows on the front side. In FIG. 4B, the position of reinforcement members 496 can be identified by stitching and straps that show on the back side.

In certain embodiments, the handles 492 can be coupled to, or engage with, one or more reinforcement members 496. FIG. 4B illustrates handles 492 coupled to a reinforcement member 496 that circumscribes the sheet 410. In certain embodiments, two of a plurality of handles 492 connect to at least one or more reinforcement members 496. For example, handles 492 on opposite sides/edges of the sheet 410 can connect to one or more reinforcement members 496. The tension transferred from use of the handles 492 can transfer to the reinforcement member 496 and provide longer durability for the sheet 410. At least one handle can connect to one of a first edge, a second edge, a third edge, and a fourth edge (e.g., top edge 412, bottom edge 414, left edge 416, and right edge 418).

Referring now to FIG. 4A, the lift device 400 can include one or more markings 498 in addition to any markings on the fasteners 462. These markings can serve a variety of purposes. In one embodiment, the markings 498 can be used to provide instructions to personnel using the lift device 400. For example, a marking 498*a* may identify which end or side of the lift device 400 is the "TOP" of the lift device 400 and may be oriented near a top of the patient 110. Having an end of the sheet 410 marked as "TOP" can be advantageous because the marking 498*a* can guide personnel in desired positioning and orientation of the lift device 400 during a lift procedure, particularly when the lift procedure is performed during a high stress or anxiety situation (e.g., the patient 110 is injured or there is a risk of fire or collapse in a building where the patient 110 is found).

As another example, a marking 498*b* may identify which side of the sheet 410 is intended to be facing and contacting the patient 110. Having a particular side of the sheet 410 facing the patient 110 can be advantageous because one side may be smoother and have a more comfortable surface than the other side.

Figure 5:
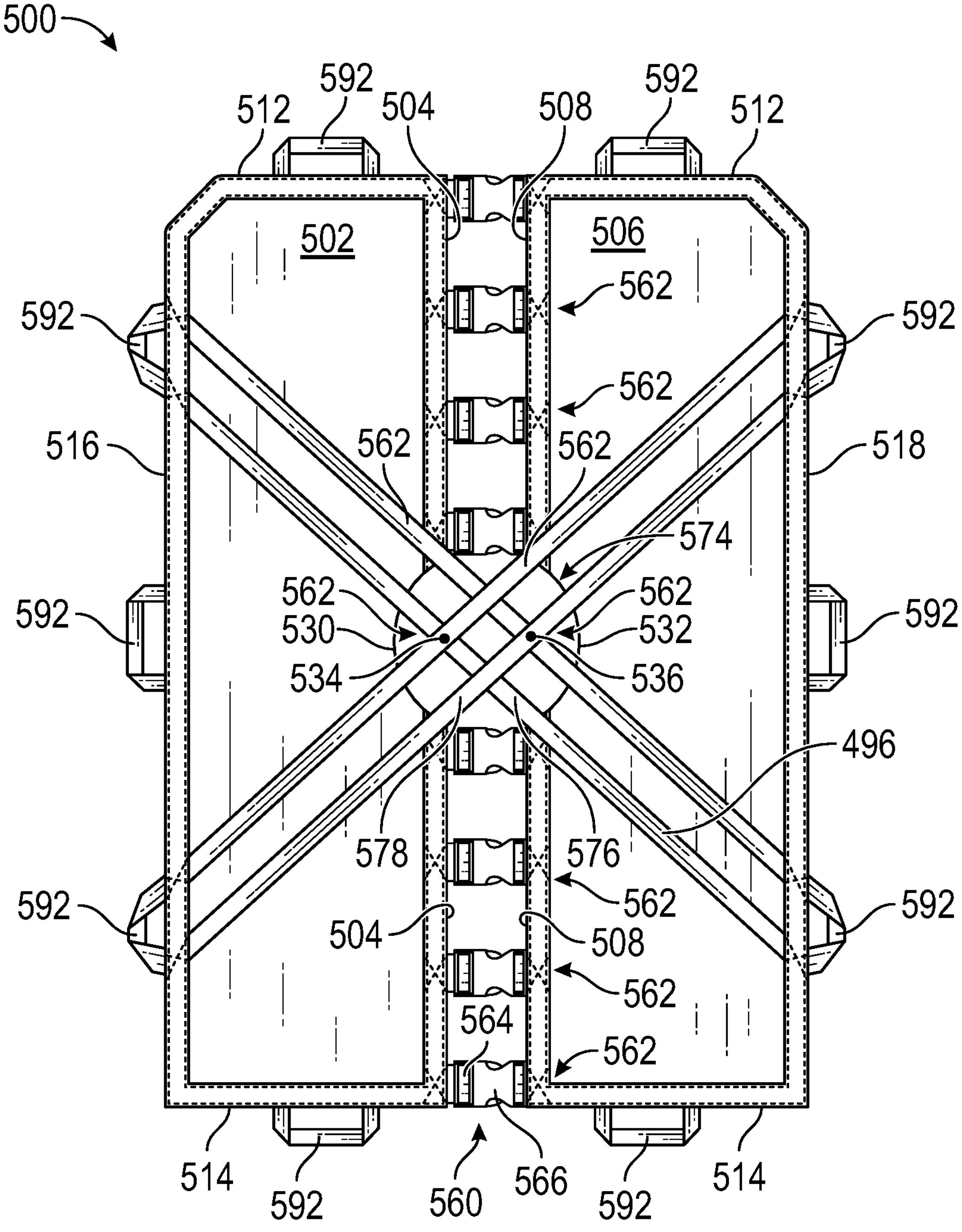
FIG. 5 is a plan view of an example lift device, according to one embodiment.

FIG. 5 illustrates a plan view of an alternative embodiment for lift device/system, lift device 500. The lift device 500 may have many structures, features, and functions, operations, and configuration similar or identical to those of the lift device 400, lift device 300, or lift device 200 described in relation to FIGS. 2-4B, like parts are identified with the same reference numerals, except the first digit of the reference number is changed for this embodiment.

The lift device 500 includes a first panel 502 having a first edge 504, a second panel 506 having a second edge 508, and a closure 560. The first panel 502 can include a top edge 512, a bottom edge 514, and a left edge 516 in addition to the first edge 504. In one embodiment, the first edge 504 extends from the top edge 512 to the bottom edge 514. Similarly, the second panel 506 can include a top edge 512, a bottom edge 514, and a right edge 518 in addition to the second edge 508.

In one embodiment, the second edge 508 extends from the top edge 512 to the bottom edge 514.

The closure 560 includes at least one fastener 562. The closure 560 joins, and/or releasably secures, the first panel 502 to the second panel 506 across an opening between the panels. With the closure 560 engaged, the closure 560 and panels 502,506 can form a sheet 510.

In one embodiment, the fastener 562 include a first member 564 coupled to one of the first edge 504 and the second edge 508 and a second member 566 coupled to the other one of the first edge 504 and the second edge 508. Thus, where the first member 564 is coupled to the first edge 504 the second member 566 is coupled to the second edge 508, and vice versa. The first member 564 and the second member 566 are configured to couple to each other. In certain embodiments, the first member 564 and the second member 566 are configured to releasably couple to each other.

In one embodiment, the first edge 504 includes a first curved section 530 and the second edge 508 includes a second curved section 532. The first curved section 530 can be positioned near a midpoint 534 of the first edge 504. The second curved section 532 can be positioned near a midpoint 536 of the second edge 508. In the illustrated embodiment, the first curved section 530 aligns with the second curved section 532 when the closure 560 is activated. In one embodiment, the first curved section 530 is opposite the second curved section 532 when the closure 560 is activated.

In contrast to other embodiments, the lift device 500 can be opened or separated near the bottom edge 514 and/or the top edge 512. In this manner, the lift device 500 can provide a level of flexibility that may be needed for certain lift operations.

The lift device 500 can include a shaped opening closure 574 that can include one or more shaped opening fasteners 576, for example one or more straps 578. In the illustrated embodiment, the strap 578 extend across an opening between the first curved section 530 and the second curved section 532. In another embodiment, the straps 578 may terminate at the first curved section 530 or the second curved section 532. Alternatively, or in addition, the straps 578 may traverse the opening and releasably engage with a coupling on an opposite side of the opening.

Figure 6:
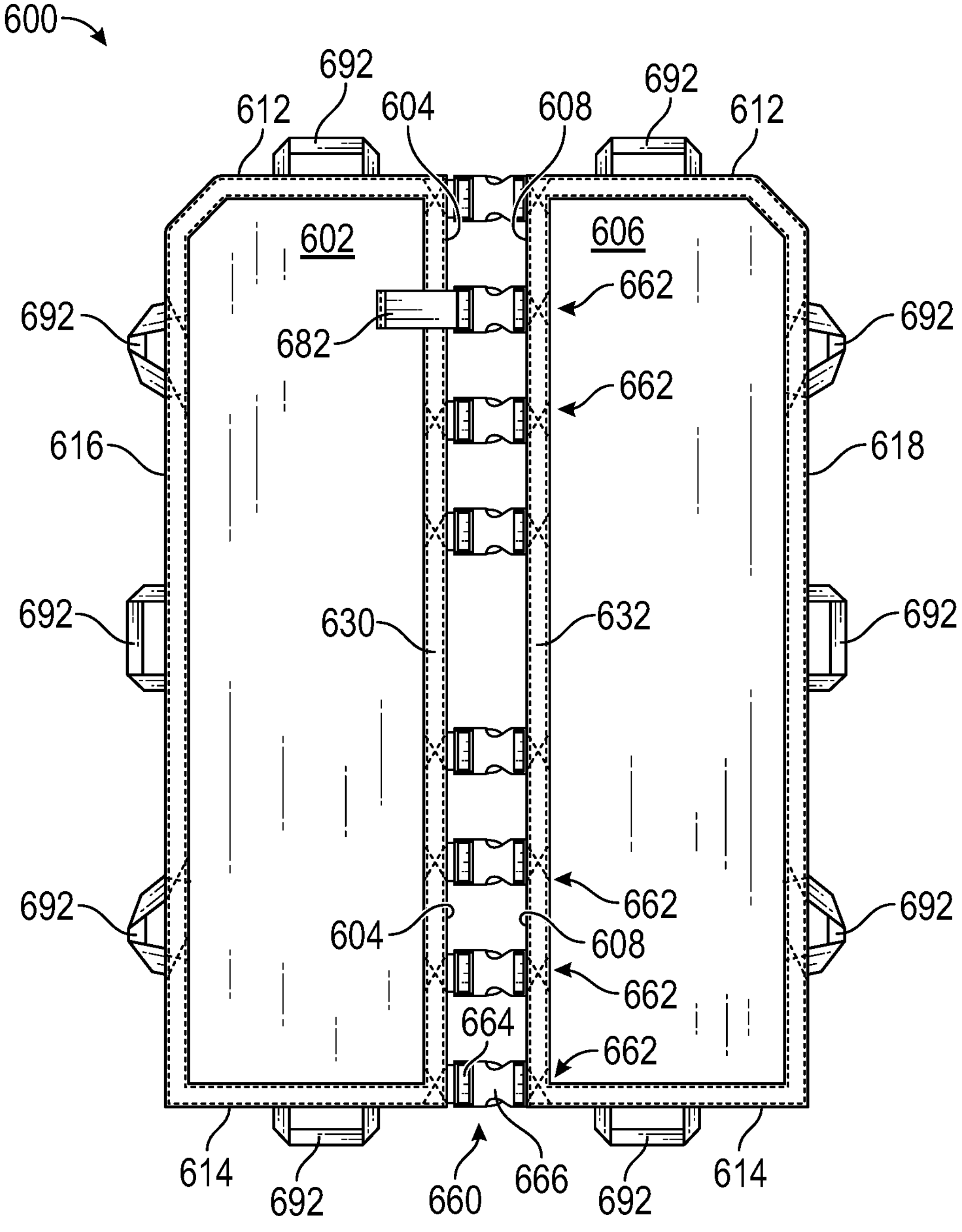
FIG. 6 is a plan view of an example lift device, according to one embodiment.

FIG. 6 illustrates a plan view of an alternative embodiment for lift device/system, lift device 600. The lift device 600 may have many structures, features, and functions, operations, and configuration similar, or identical, to those of the lift device 500, lift device 400, lift device 300, or lift device 200 described in relation to FIGS. 2-5, like parts are identified with the same reference numerals, except the first digit of the reference number is changed for this embodiment.

In the illustrated embodiment, the lift device 500 can include top edges 512, bottom edges 514, a left edge 516, and right edge 518. One or more handles 592 may be coupled to one or more of the edges. In this manner, the lift device 500 can include a plurality of handles 592 around the edges. The handles 592 can provide a strategic and/or convenient location for a user, such as an emergency responder, to hold the lift device 500 during a lift operation.

The lift device 600 includes a first panel 602 having a first edge 604, a second panel 606 having a second edge 608, and a closure 660. The first panel 602 can include a top edge 612, a bottom edge 614, and a left edge 616 in addition to the first edge 604. In one embodiment, the first edge 604 extends from the top edge 612 to the bottom edge 614. Similarly, the second panel 606 can include a top edge 612, a bottom edge 614, and a right edge 618 in addition to the second edge 608. In one embodiment, the second edge 608 extends from the top edge 612 to the bottom edge 614.

The closure 660 includes at least one fastener 662. The closure 660 joins, and/or releasably secures, the first panel 602 to the second panel 606 across an opening between the panels. With the closure 660 engaged, the closure 660 and panels 602,606 can form a sheet 610.

In one embodiment, the fastener 662 include a first member 664 coupled to one of the first edge 604 and the second edge 608 and a second member 666 coupled to the other one of the first edge 604 and the second edge 608. Thus, where the first member 664 is coupled to the first edge 604, the second member 666 is coupled to the second edge 608, and vice versa. The first member 664 and the second member 666 are configured to couple to each other. In certain embodiments, the first member 664 and the second member 666 are configured to releasably couple to each other. The fastener 662 can include a strap 678. In one embodiment, the fastener 662 is adjustable and includes an end 682 that can be pulled to shorten a strap 678. In certain embodiments, one first member 664 and/or second member 666 can be secured to the first edge 604/second edge 608 by way of a direct connection to the edge, or by way of a strap that extends for a distance from the edge.

In contrast to other embodiments, the lift device 600 can be opened or separated near the bottom edge 614 and/or the top edge 612. In this manner, the lift device 600 can provide a level of flexibility that may be needed for certain lift operations. In further contrast to other embodiments, the first edge 604 includes a first straight section 630 and the second edge 608 includes a second straight section 632 rather than a first curved section 530 and/or a second curved section 532. In the illustrated embodiment, the first straight section 630 aligns with the second straight section 632 when the closure 660 is activated. In one embodiment, the first straight section 630 is opposite the second straight section 632 when the closure 660 is activated. In certain embodiments, the first straight section 630 and/or second straight section 632 can include one or more fasteners 662.

In the illustrated embodiment, the lift device 600 can include top edges 612, bottom edges 614, a left edge 616, and right edge 618. One or more handles 692 may be coupled to one or more of the edges. In this manner, the lift device 600 can include a plurality of handles 692 around the edges. The handles 692 can provide a strategic and/or convenient location for a user, such as an emergency responder, to hold the lift device 600 during a lift operation.

Figure 7:
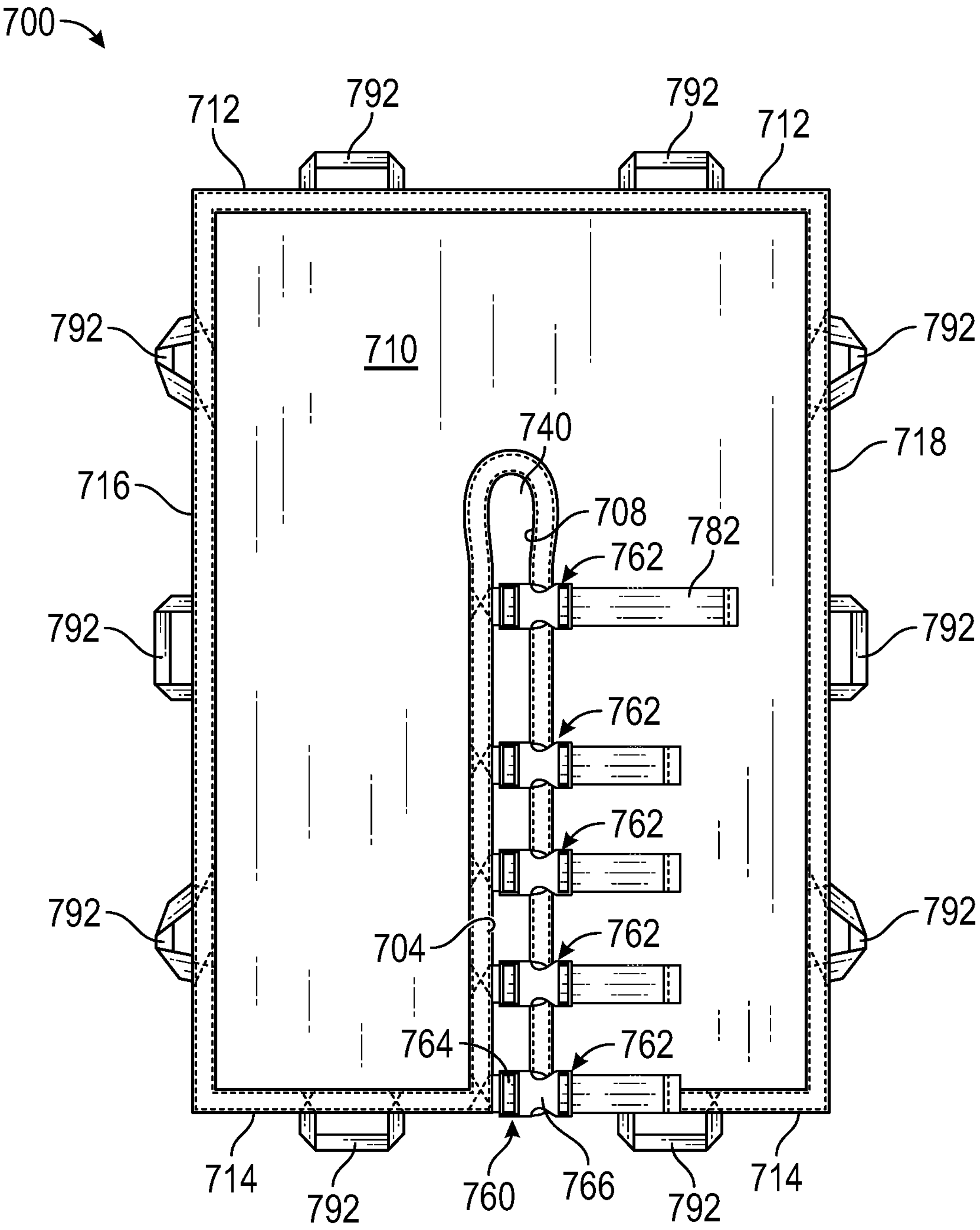
FIG. 7 is a plan view of an example lift device, according to one embodiment.

FIG. 7 illustrates a plan view of an alternative embodiment for lift device/system, lift device 700. The lift device 700 may have many structures, features, and functions, operations, and configuration similar, or identical, to those of the lift device 600, lift device 500, lift device 400, lift device 300, or lift device 200 described in relation to FIGS. 2-6, like parts are identified with the same reference numerals, except the first digit of the reference number is changed for this embodiment.

The lift device 700 includes a sheet 710 and an opening 740 having a first edge 704, a second edge 708, and a closure 760. The sheet 710 can include a top edge 712, a bottom edge 714, a left edge 716, and a right edge 718. In one embodiment, opening 740 extends from the bottom edge 714 towards the top edge 712. In certain embodiments, the opening 740 may be referred to as a slit and can extend from the bottom edge 714 to beyond a midpoint of the sheet 710.

The closure 760 includes at least one fastener 762. The closure 760 joins, releasably secures, and/or closes the opening 740. In one embodiment, a fastener 762 can include a first member 764 coupled to one of the first edge 704 and the second edge 708 and a second member 766 coupled to the other one of the first edge 704 and the second edge 708. Thus, where the first member 764 is coupled to the first edge 704, the second member 766 is coupled to the second edge 708, and vice versa. The first member 764 and the second member 766 are configured to couple to each other. In certain embodiments, the first member 764 and the second member 766 are configured to releasably couple to each other. The fastener 762 can include a strap 778. In one embodiment, one or more of the fasteners 762 is adjustable and can include an end 782 that can be pulled to shorten a strap 778. In certain embodiments, one first member 764 and/or second member 766 can be secured to the first edge 704/second edge 708 by way of a direct connection to the edge, or by way of a strap that extends for a distance from the edge.

In contrast to other embodiments, the first edge 704 includes an opening 740 that is a single slit and may not include a shaped opening at one end of the slit. Such an embodiment may be simpler and less expensive to fabricate.

In the illustrated embodiment, the lift device 700 can include a top edge 712, a bottom edge 714, a left edge 716, and right edge 718. One or more handles 792 may be coupled to one or more of the edges. In this manner, the lift device 700 can include a plurality of handles 792 around the edges. The handles 792 can provide a strategic and/or convenient location for a user, such as an emergency responder, to hold the lift device 700 during a lift operation.

Figure 8:
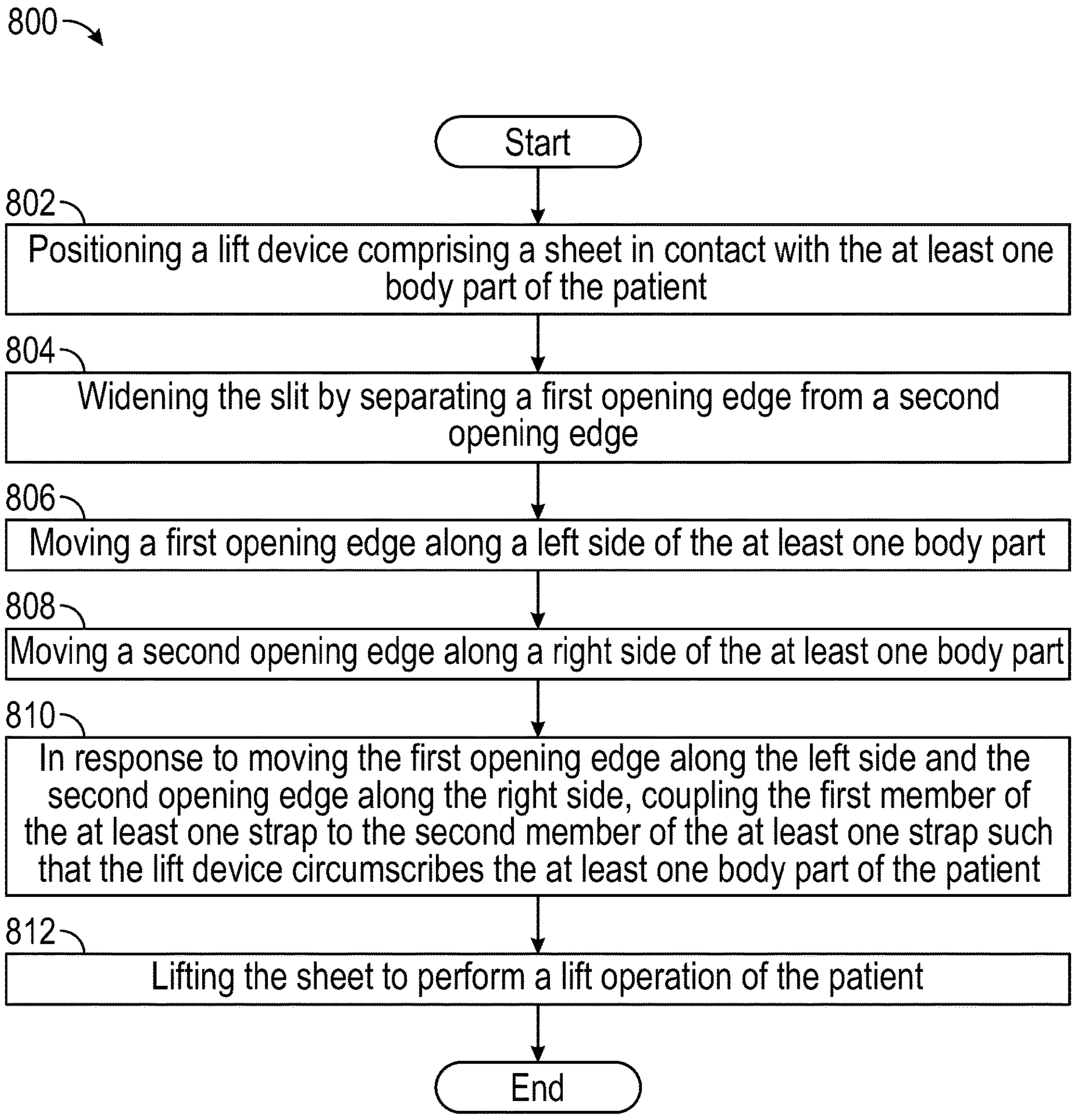
FIG. 8 a flowchart diagram depicting a method for lifting a patient, according to one embodiment.

FIG. 8 a flowchart diagram depicting a method 800 for lifting a patient 110, according to one embodiment. In some implementations, one or more process blocks of FIG. 8 may be performed by a lift device, a lift system, or a lift apparatus.

As shown in FIG. 8, method 800 may include positioning 802 a lift device 200, 300, 400, 500, 600, 700 in contact with the at least one body part of the patient 110. The lift device can include: a sheet and a slit that extends from an edge of the sheet. The slit may include a first opening edge and a second opening edge opposite the first opening edge. The lift device can also include a shaped opening that connects to the slit and is within a perimeter of the sheet; at least one strap having a first end coupled near a first side of the shaped opening and a second end coupled near a second side of the shaped opening; and at least one fastener that includes a first member coupled near the first opening edge and a second member coupled near the second opening edge, the second member can be configured to releasably engage the first member. The second end of the at least one strap can be opposite the first end or the second end of the at least one strap can be positioned at a location that is not opposite the first end.

As also shown in FIG. 8, method 800 may include widening 804 the slit by separating the first opening edge from the second opening edge. For example, a user may widen the slit by separating the first opening edge from the second opening edge, as described above.

Method 800 may include moving 806 the first opening edge along a left side of at least one body part of the patient 110. For example, a user may move the first opening edge along a left side of the at least one body part, as described above.

Method 800 may include moving 808 the second opening edge along a right side of the at least one body part of the patient 110, the second side opposite the first side, such that the shaped opening is drawn against a third side of the at least one body part, the third side between the first side and the second side. For example, a user may move the second opening edge along a right side of the at least one body part, the second side opposite the first side, such that the shaped opening is drawn against a third side of the at least one body part, the third side between the first side and the second side, as described above.

Method 800 may include, in response to moving the first opening edge along the left side and the second opening edge along the right side, coupling 810 the first member of the at least one strap to the second member of the at least one strap such that the lift device circumscribes the at least one body part of the patient 110. For example, a user may in response to moving the first open edge along the left side and the second opening edge along the right side, couple the first member of the at least one strap to the second member of the at least one strap such that the lift device circumscribes the at least one body part of the patient 110, as described above.

Method 800 may include lifting 812 the sheet to perform a lift operation of the patient 110. For example, one or more users may lift the sheet to perform a lift operation of the patient 110, as described above.

Although FIG. 8 shows example blocks of method 800, in some implementations, method 800 may include additional blocks, fewer blocks, different blocks, or differently arranged blocks than those depicted in FIG. 8. Additionally, or alternatively, two or more of the blocks of method 800 may be performed in parallel.

In one embodiment, such as an example in FIG. 8, a method for lifting a patient having at least one body part resting on a floor or ground is provided. The method includes:

positioning a lift device in contact with the at least one body part of the patient, the lift device comprising:
a sheet;
a slit that extends from an edge of the sheet, the slit comprising a first opening edge and a second opening edge opposite the first opening edge;
a shaped opening that connects to the slit and is within a perimeter of the sheet;
at least one strap having a first end coupled near a first side of the shaped opening and a second end coupled near a second side of the shaped opening;
at least one fastener having a first member coupled near the first opening edge and a second member coupled near the second opening edge, the second member configured to releasably engage the first member;
widening the slit by separating the first opening edge from the second opening edge;
moving the first opening edge along a left side of the at least one body part;
moving the second opening edge along a right side of the at least one body part, the second side opposite the first side, such that the shaped opening is drawn against a third side of the at least one body part, the third side between the first side and the second side;
in response to moving the first opening edge along the left side and the second opening edge along the right side, coupling the first member of the at least one strap to the second member of the at least one strap such that the lift device circumscribes the at least one body part of the patient; and
lifting the sheet to perform a lift operation of the patient.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, FIG., or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 Para. 6. It will be apparent to those having skill in the art that changes may be made to the details of the above-described embodiments without departing from the underlying principles set forth herein.

While specific embodiments and applications of the present disclosure have been illustrated and described, it is to be understood that the scope of this disclosure is not limited to the precise configuration and components disclosed herein. Various modifications, changes, and variations which will be apparent to those skilled in the art may be made in the arrangement, operation, and details of the methods and systems of the present disclosure set forth herein without departing from it spirit and scope.

What is claimed is:

1. A lift device for lifting a patient, the lift device comprising:

a sheet;

an opening that extends from an edge of the sheet;

a closure comprising a fastener configured to extend across the opening;

wherein activation of the closure at least partially closes the opening;

wherein the opening comprises:

a slit that extends from the edge of the sheet; and a shaped opening within a perimeter of the sheet, the shaped opening connected to the slit; and a shaped opening closure comprising a shaped opening fastener that traverses the shaped opening.

2. The lift device of claim 1, wherein the shaped opening closure comprises a plurality of shaped opening fasteners that traverse the shaped opening and each shaped opening fastener of the plurality of shaped opening fasteners comprise a strap connected at a first end to one side of the shaped opening and connected at a second end to an opposite side of the shaped opening.

3. The lift device of claim 2, wherein the sheet comprise three or more edges and wherein each strap of a shaped opening fastener couples to a handle near an edge of the sheet that does not include the opening.

4. The lift device of claim 1, wherein the fastener comprises a first member and a second member configured to releasably engage the first member.

5. The lift device of claim 1, further comprising a shaped opening within a perimeter of the sheet, the shaped opening connected to the opening.

6. The lift device of claim 1, wherein the opening comprises:

a first opening edge and a second opening edge opposite the first opening edge; and wherein the fastener comprises a first member, a second member, and a strap having:

a first end coupled to the first member;

a second end coupled to the sheet near the first opening edge; and wherein the second member is coupled to the sheet near the second opening edge.

7. The lift device of claim 1, wherein the closure comprises a plurality of fasteners spaced along a length of the opening.

8. The lift device of claim 1, wherein the fastener comprises an adjustable fastener configured to adjust from a first length to a second length.

9. A lift system for lifting a patient, the lift system comprising:

a sheet comprising a first edge, a second edge opposite and parallel to the first edge, a third edge, and a fourth edge opposite and parallel to the third edge;

a shaped opening within a perimeter of the sheet;

a slit that extends from the fourth edge and connects to the shaped opening; and a closure that at least partially closes the shaped opening and the slit when the closure is activated; and wherein the closure comprises:

a shaped opening closure comprising at least one strap, the at least one strap comprising a first end connected to a first edge of the shaped opening and a second end connected to a second edge of the shaped opening, the second edge opposite of the first edge; and a slit closure comprising at least one fastener comprising a first member and a second member configured to releasably engage the first member.

10. The lift system of claim 9, wherein the at least one strap of the shaped opening closure is configured to close off the shaped opening during a lift operation and wherein the shaped opening comprises an edge comprising a reinforcement member.

11. The lift system of claim 9, wherein the first member comprises a male side squeeze buckle and the second member comprises a corresponding female side squeeze buckle.

12. The lift system of claim 9, wherein the at least one fastener comprises a first strap adjustably connected to the first member and a second strap connected to the second member such that a length of the second strap is adjustable.

13. The lift system of claim 9, further comprising:

at least one handle connected to one of the first edge, second edge, third edge, and fourth edge; and at least one reinforcement member that extends across a portion of the sheet.

14. The lift system of claim 13, wherein two of the plurality of handles connect to the at least one reinforcement member.

15. The lift system of claim 9, wherein the closure comprises:

a biasing member having a first end and second end, the first end connected to the sheet and the second end connected to one edge of one of the shaped opening and the slit;

two or more fasteners and each of the fasteners comprise a marking that facilitates activation of the closure; and wherein the biasing member is configured to apply a closure force on the one edge of the shaped opening in response to the one edge of the shaped opening being moved away from another edge of one of the shaped opening and the slit.

* * * * *